(12) United States Patent
McBride et al.

(10) Patent No.: US 9,675,881 B2
(45) Date of Patent: *Jun. 13, 2017

(54) VIRTUAL WORLD ELECTRONIC GAME

(71) Applicant: MGA Entertainment, Inc., Van Nuys, CA (US)

(72) Inventors: Susan McBride, Redondo Beach, CA (US); Stephen Mitchell, Monmouth (GB)

(73) Assignee: MGA ENTERTAINMENT, INC., Van Nuys, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 14/922,109

(22) Filed: Oct. 23, 2015

(65) Prior Publication Data

US 2016/0051897 A1 Feb. 25, 2016

Related U.S. Application Data

(63) Continuation of application No. 11/828,019, filed on Jul. 25, 2007, now Pat. No. 9,205,329.

(60) Provisional application No. 60/833,233, filed on Jul. 25, 2006.

(51) Int. Cl.
| | |
|---|---|
| A63F 13/00 | (2014.01) |
| A63F 13/31 | (2014.01) |
| A63F 13/335 | (2014.01) |
| A63F 13/30 | (2014.01) |
| A63F 13/235 | (2014.01) |
| A63F 13/35 | (2014.01) |
| A63F 13/825 | (2014.01) |
| A63F 13/92 | (2014.01) |
| A63F 9/24 | (2006.01) |

(52) U.S. Cl.
CPC ........... *A63F 13/31* (2014.09); *A63F 9/24* (2013.01); *A63F 13/12* (2013.01); *A63F 13/235* (2014.09); *A63F 13/335* (2014.09); *A63F 13/35* (2014.09); *A63F 13/825* (2014.09); *A63F 13/92* (2014.09); *A63F 2009/2457* (2013.01); *A63F 2300/204* (2013.01); *A63F 2300/405* (2013.01); *A63F 2300/407* (2013.01); *A63F 2300/5533* (2013.01); *A63F 2300/5553* (2013.01)

(58) Field of Classification Search
CPC ..... G06F 17/30017; A63F 13/10; A63F 13/12
USPC ...... 463/32, 40, 29, 42–44, 30, 31; 345/591; 708/200; 707/E17.009
See application file for complete search history.

(56) References Cited

U.S. PATENT DOCUMENTS

| | | |
|---|---|---|
| 5,572,646 A | 11/1996 | Kawai et al. |
| 5,586,257 A | 12/1996 | Perlman |
| 5,618,045 A | 4/1997 | Kagan et al. |
| 5,695,400 A | 12/1997 | Fennell, Jr. et al. |
| 5,754,740 A | 5/1998 | Fukuoka et al. |

(Continued)

*Primary Examiner* — Masud Ahmed
(74) *Attorney, Agent, or Firm* — Intellectual Property Law Offices of Joel Voelzke, APC

(57) ABSTRACT

An electronic game for playing on a portable handheld game unit and on-line includes a dynamic animated virtual character that can be customized and updated both visually and functionally through game play and that can translate from a two dimensional visual presentation on a game unit to a higher order visual presentation in an interactive multi-player virtual world on-line and back while retaining any customization or upgrades is provided. Different versions of the electronic game produce different virtual characters that can interact on-line or through wireless linkage between game units.

19 Claims, 4 Drawing Sheets

(56) References Cited

U.S. PATENT DOCUMENTS

| | | |
|---|---|---|
| 5,779,549 A | 7/1998 | Walker et al. |
| 5,797,085 A | 8/1998 | Beuk et al. |
| 5,854,624 A | 12/1998 | Grant |
| 5,855,483 A | 1/1999 | Collins et al. |
| 5,885,156 A | 3/1999 | Toyohara et al. |
| 5,890,964 A | 4/1999 | Aoki et al. |
| 5,964,660 A | 10/1999 | James et al. |
| 5,966,526 A | 10/1999 | Yokoi |
| 5,971,855 A | 10/1999 | Ng |
| 5,982,390 A | 11/1999 | Stoneking et al. |
| 6,020,892 A | 2/2000 | Dillon |
| 6,028,866 A | 2/2000 | Engel et al. |
| 6,031,549 A | 2/2000 | Hayes-Roth |
| 6,084,584 A | 7/2000 | Nahi et al. |
| 6,141,019 A | 10/2000 | Roseborough et al. |
| 6,171,189 B1 | 1/2001 | Katano et al. |
| 6,193,609 B1 | 2/2001 | D'Achard Van Enschut |
| 6,213,871 B1 | 4/2001 | Yokoi |
| 6,227,966 B1 | 5/2001 | Yokoi |
| 6,238,291 B1 | 5/2001 | Fujimoto et al. |
| 6,241,612 B1 | 6/2001 | Heredia |
| 6,251,010 B1 | 6/2001 | Tajiri et al. |
| 6,253,167 B1 | 6/2001 | Matsuda et al. |
| 6,267,677 B1 | 7/2001 | Tajiri et al. |
| 6,268,872 B1 | 7/2001 | Matsuda et al. |
| 6,273,815 B1 | 8/2001 | Stuckman et al. |
| 6,278,985 B1 | 8/2001 | Hatayama |
| 6,292,198 B1 | 9/2001 | Matsuda et al. |
| 6,293,798 B1 | 9/2001 | Boyle et al. |
| 6,302,789 B2 | 10/2001 | Harada et al. |
| 6,313,843 B1 | 11/2001 | Tanii et al. |
| 6,369,827 B1 | 4/2002 | Pan et al. |
| 6,383,075 B1 | 5/2002 | Jeong et al. |
| 6,405,249 B1 | 6/2002 | Matsuda et al. |
| 6,406,370 B1 | 6/2002 | Kumagai |
| 6,482,092 B1 | 11/2002 | Tajiri et al. |
| 6,540,606 B1 | 4/2003 | Matsukata |
| 6,704,784 B2 | 3/2004 | Matsuda et al. |
| 6,793,580 B2 | 9/2004 | Sinclair et al. |
| 6,811,487 B2 | 11/2004 | Sengoku |
| 6,832,955 B2 | 12/2004 | Yokoi |
| 6,855,057 B2 | 2/2005 | Namba et al. |
| 6,881,147 B2 | 4/2005 | Naghi et al. |
| 6,893,347 B1 | 5/2005 | Zilliacus et al. |
| 6,951,516 B1 | 10/2005 | Eguchi et al. |
| 6,964,608 B1 | 11/2005 | Koza |
| 6,967,566 B2 | 11/2005 | Weston et al. |
| 7,445,549 B1 | 11/2008 | Best |
| 7,677,974 B2 | 3/2010 | Van Luchene |
| 8,608,535 B2 | 12/2013 | Weston et al. |
| 2004/0063498 A1 | 4/2004 | Oakes et al. |
| 2004/0087369 A1 | 5/2004 | Tanaka et al. |
| 2004/0092311 A1 | 5/2004 | Weston et al. |
| 2004/0102249 A1 | 5/2004 | Meyers et al. |
| 2004/0162136 A1 | 8/2004 | Yamato et al. |
| 2004/0224774 A1 | 11/2004 | Nakai |
| 2005/0137014 A1 | 6/2005 | Vetelainen |
| 2005/0202872 A1 | 9/2005 | Niemela |
| 2005/0233804 A1 | 10/2005 | Hata |
| 2005/0266907 A1 | 12/2005 | Weston et al. |
| 2005/0272504 A1 | 12/2005 | Eguchi et al. |
| 2005/0282639 A1 | 12/2005 | Tanaka et al. |
| 2007/0087835 A1 | 4/2007 | Van Luchene |
| 2007/0233759 A1 | 10/2007 | Tomlinson et al. |

VIRTUAL WORLD ELECTRONIC GAME

CROSS-REFERENCE TO RELATED APPLICATIONS

This application is a continuation of U.S. patent application Ser. No. 11/828,019 filed Jul. 25, 2007, which claims priority from U.S. Provisional Patent Application No. 60/833,233 filed Jul. 25, 2006.

BACKGROUND OF THE INVENTION

1. Field of the Invention

This invention relates to the field of electronic game systems. More particularly, this invention relates to the field of handheld or portable electronic game playing consoles or units that are uniquely adapted to reversibly and completely translate one or more user controlled dynamic virtual game characters from a portable game playing unit to a shared, multi-dimensional, on-line virtual world of interacting animated digital characters, each additional digital character itself translated to the associated virtual world from its own user controlled portable game playing unit along with its own persistent characteristics, and/or to obtain a character or download a character from the Internet to the portable game playing unit.

2. Description of Related Art

Electronic or digital games have been with us since the 1970s. Long before the wide availability of personal computers and laptops, electronic games were appearing in arcades and commercial spaces as dedicated, freestanding gaming stations analogous to pinball machines with two-dimensional (2D) video screens and simple push button and joystick user controls. Game players or users would utilize these controls to manipulate simple animated objects such as space ships and ping-pong paddles displayed on the video screens to accomplish limited objectives and to score points.

Over the following decades, as digital, computer, and video technology evolved, game developers and designers quickly adapted their games to take advantage of the new features and capacities offered by these enhanced technologies. Electronic games became more complex and their graphic user interfaces through their video screens and displays became more realistic and engaging as computer processing speeds and data transfer rates increased. As developing technology overcame the early technical limitations to electronic game design game objectives evolved beyond simply scoring points to solving mysteries and unraveling secrets in increasingly complex environments. Previously, only textually based computer games analogous to interactive novels could address such complex plot and story lines. With advances in technology electronic games became challenging animated visual games with equally complex plots and sophisticated visual environments. Solving these complex games could take dozens of hours of playing time spread over days or weeks.

With the contemporaneous growth of the home computer market, electronic gaming moved from dedicated freestanding arcade gaming stations to personal computers at home and from there to the Internet where multiple players in different locations could participate in a common game with one another through on-line web servers.

These on-line gaming experiences grew into massively multi-player on-line role-playing games where hundreds, thousands, and even millions of individual players could participate and compete with one another on-line, simultaneously. Game action took place in multicolor virtual visual environments provided with depth perception, complex movement, and exotic virtual landscapes and topographies having Medieval, science fiction, or other stylistic themes to enhance the game playing experience with added degrees of realism and increasingly accurate physical properties and character movement capabilities.

At the same time, as microcircuitry and electronic video components became cheaper to produce and less energy demanding, small 2D video screens became more readily available, allowing electronic games to move in the other direction, toward simplified handheld or portable game playing stations. Typically designed for children, these portable video or electronic game toys initially took already popular electronic video games and known game characters having static visual appearances and characteristics and revised them to operate in the more limited 2D virtual environment provided by the portable game toy. With simplified graphics and character movements rendered in 2D, children were able to direct these characters with simple push buttons to control character movement or actions. Later handheld games were developed on their own to provide children with novel game experiences and activities involving new characters such as virtual pets requiring ongoing monitoring and involvement from the game user/pet owner.

More recently, game designers have worked to interconnect such handheld portable game playing units to allow children to interact with each other's game units and game characters on their own game unit displays. In some cases, objects such as bouncing balls or even game characters can move from one handheld game unit display to another electronically connected game unit display and back again. However, these shared, moving characters remain static when moving between game unit displays in that their two-dimensional visual representations and user controllable characteristics do not change when they move between displays.

Similarly, there is no real linkage or interface between the virtual environment and characters existing in the current handheld or portable 2D game playing units and their corresponding 3D personal computer or Internet counterparts. Instead, the current state of the art requires that handheld versions and corresponding computer based or Internet versions of a single game actually are independent, parallel software driven constructs that have been specifically designed and developed for each respective handheld or computer driven version of the game. Each independent version of the game sharing similar stylistic and graphic design themes and game playing elements specifically configured to operate in either the 2D handheld environment or in the 3D computer driven or Internet driven gaming environment.

This provides a game player who is familiar with the 2D handheld version of a game with a common, recognizable computer or Internet version of the game that is designed to operate in a different, more complex playing environment. Thus, a game player familiar with either the portable handheld version of a game or with the computer or Internet version of the game can play each similar version of the game utilizing the same basic themes, characters, functional features, and rules, in a different gaming environment having its own benefits and features. Namely, the handheld 2D game units, which in some cases have simple 3D graphics, provide the benefits of portability and simplicity while the 3D computer and Internet game versions provide enhanced graphics and potentially increased functions and capabilities to the game characters. However, the game player must purchase two different versions of the game to play in both operating environments.

SUMMARY OF THE INVENTION

The present invention address the problem of separate and distinct handheld 2D and on-line 3D versions of a single electric game by providing the game player or game user with a single game version that can translate its user controlled virtual character or characters to function effectively with all the appropriate identifying features, elements, characteristics, and functions in either a 2D portable handheld game unit driven environment or in a 3D computer driven or on-line computer network or Internet driven game environment. In this manner, the present invention provides a game player with the first, full color, interactive, user controlled, virtual character that can leave the 2D portable game playing environment and enter a 3D world on-line where other user controlled virtual characters can interact with each other and with the game playing environment to, among other things, explore, play games, compete, solve puzzles, chat, and acquire possessions that can be used or traded between virtual characters.

For present purposes, the term "3D" denotes a virtual world in which scenes are illustrated with depth perspective, and characters can be commanded so that they appear to move not merely laterally within a scene but deeper into the scene as well.

Further, the present invention provides the ability for each individual user driven virtual character to be trained through user driven experiences and activities in either the 2D or 3D game playing environment and to maintain these learned or trained characteristics and changes whenever the virtual character translates either to or from the portable game environment or the computer driven or on-line operating environment.

Thus, with the unique capabilities of the present invention, changes to a virtual character's characteristics, possessions, or even new characteristics that develop through game playing use and through interaction with the virtual environments and with other user driven virtual characters in either the 2D or 3D game operating environment will persist and translate with the virtual character each time it translates to or from the portable handheld operating environment to the computer or Internet environment. In this manner, the present invention provides the game user with a virtual character or companion that can learn through experience, be trained, customized, and modified to develop its functions and capabilities in new directions as well as to acquire, use, or dispose of items and possessions in either operating environment and have these changes persist and remain with the virtual character whenever it translates to the other operating environment or back.

In the present invention each individual handheld or portable game playing unit defines, generates, and with game player input operates or controls one or more respective user controlled virtual characters. These characters can be operated in both the portable game playing unit environment and the computer driven or Internet driven game environment. The present invention is able to provide this unique ability through novel systems, methods, and apparatus that effectively translate the virtual characters of each portable game playing unit from the handheld unit to a computer driven or Internet driven game environment, along with all of the virtual character's persistent training, possessions, and other characteristics and features. Once there, the character will be generated and presented on a display or computer screen with the appropriate visual features and abilities for the operating environment. The game player or user can continue to control the virtual character on-line with the same or similar inputs and commands used to control the virtual character through the portable game playing unit or the computer keyboard.

By "translate" it is meant that the present invention does more than simply move or transfer the virtual character from one game environment to another. The present invention actually alters the form, appearance, and nature of the virtual character from the 2D virtual world of the portable game playing unit to the higher order 3D virtual world of the computer driven or Internet environment. As a result, when played on-line the virtual characters of the present invention will have three dimensional visual features including shading and depth and will be able to move and operate in three dimensions. When the characters translate back to their respective portable game playing units they will be generated and presented within the portable game playing unit to look and function appropriately in two dimensions.

This provides the game user with a more rewarding experience than can be found with prior art electronic games. Rather than being stuck in a flat 2D virtual world, or with the relatively unsophisticated 3D graphics available for some handheld games, users of the present invention can expand and enhance their gaming experiences by operating and controlling his or her individual, game playing unit defined virtual character in a multi-dimensional interactive virtual world populated with other independent portable game playing unit defined characters, each generated and presented within the computer or computer network with all identifying features and characteristics and controlled by other individual game players at remote locations throughout the nation or even throughout the world. Moreover, the abilities and capabilities of the virtual characters are enhanced when generated on-line so that they can train and learn more, acquire more and different characteristics and possession, and develop beyond the original capacities provided by the portable game playing unit generated characters. These modifications also can include modifications and updates to both the character and to the game through software downloads from the server.

As a result, unlike the prior art electronic games, the present invention has direct applicability to both the handheld, portable gaming environment and to the computer or Internet gaming environment. Because of this, the present invention provides the game player with a consistent and familiar gaming experience in either environment in spite of the functional and visual translational changes imparted to the virtual characters by the present invention to operate in either the 2D or 3D gaming environments. This is accomplished by the present invention in a game system using methods, software, and apparatus configured to provide interaction within a persistent virtual world between multiple, player controlled portable game playing unit defined, network generated translated virtual characters, each having individual characteristics and features that will persist with the character and translate with it to and from either gaming environment.

In one aspect thereof the present invention is a game system including a portable game playing unit having a display and at least one player input control, a computing mechanism for generating an identifiable first virtual character on the display, and a communications port for connecting the game playing unit to a first computer coupled to a computer network. The first computer is provided with a screen for presenting visual information generated by the first computer and/or through the computer network. Additionally, the game system includes a server coupled to the computer network along with software programming the portable game playing unit computing mechanism, the first computer, and the server, such that the first virtual character can translate to and from the portable game playing unit display to and from the computer screen and back in response to input commands from a first player. When the first virtual character is on the computer screen, it is generated on-line and acts within a multi-player virtual world according to commands input by the first player to the keyboard and/or other input device of the first computer. The multi-player virtual world of the present invention includes at least a second virtual character controlled by a second player.

Additionally, the virtual characters of the present invention each have at least one characteristic that can change during play of the game. Exemplary changeable characteristics include, without limitation, physical appearance and varying degrees of simple physical or mental states such as hunger, thirst, fatigue, sleepiness, boredom, and happiness. Relatively simple changeable characteristics also include, without limitation, possessions such as food, water, credits, money, clothing, accessories, medals, and tools such as weapons or keys and the like that can be acquired, traded, used, sold, or given away during game play. It is also within the scope of the present invention for the virtual characters to have more sophisticated changeable characteristics including, without limitation, personalities, attitudes, interests, spontaneous behaviors, training, learning, memory, strength, mobility, flexibility, and fighting ability.

The second and any additional virtual characters interacting in the game playing environments also can have at least one such individual characteristic that can change during play of the game. Further, within the scope and teachings of the present invention any changes to these characteristics will be "persistent" meaning that they will remain with a virtual character even when the game is turned off or put to sleep and they will migrate with the virtual character as it translates to and from the portable game playing unit or the computer or computer network in response to player commands.

In another aspect, the present invention is of a portable or handheld game playing unit having a console with a display, at least one player input control, and a computing mechanism for generating a first virtual character on the display. The unit also includes a communications port for connecting to a computer having a computer screen and itself coupled to a computer network. Software programming in the portable game playing unit computing mechanism and preferably the computer or computer network allows the first virtual character to translate from the portable game playing unit display to the computer screen or back to the portable game playing unit display in response to one or more commands input by a first player. When translated the first virtual character is generated by the on-line software and presented on the computer screen, yet continues to be controlled by the first player through game playing unit or computer input commands so that it acts within a multi-player virtual world including at least a second virtual character controlled by a second player. The portable game playing unit also is programmed so that the first virtual character has at least one characteristic that can be changed through game play or interaction with the multi-player virtual world or with the second virtual character or others, or in the portable game playing unit and that when changed will persist with the virtual character and will translate along with the virtual character and its identifying characteristics when it translates to and from the portable game playing unit display to the computer screen and back.

Preferably, the portable game playing unit of the present invention includes a console having a relatively low cost color display, at least four player input control buttons, preferably at least one megabyte of executable flash memory, optional read only memory, an audio out system, a computing mechanism for generating a first virtual character on the display and for retaining identifying characteristics and changes thereto and for delivering this data to a computer or computer network when on-line interfacing, and a universal serial bus (USB) communications port for connecting to a computer having a computer screen and itself coupled to a computer network.

In yet another aspect, the present invention is of a web server for playing a multiplayer electronic game on-line. The web server utilizes a computing mechanism communicating with at least one computer having a screen and connected to a portable game playing unit having a display for playing an electronic game to allow the computing mechanism to interact with the computer and the portable game playing unit. The web server also has a database or repository of data content for receiving data identifying a specific virtual character and any changes to its features and characteristics. The software programs the computing mechanism such that the web server can manage and respond to requests and deliver static, existing content data or dynamic content data generated by another program or even additional programs to and from the database to the computer or to the connected portable game playing unit and back.

The software also programs the computing mechanism to allow at least one virtual character to translate from the portable game playing unit display to the computer screen, or back, in response to game progression such as commands input by a player using the portable game playing unit. Once the virtual character is translated from the portable game playing unit the web server software generates an enhanced version of the virtual character including its generic and identifying features and characteristics and presents heightened, more intense visual animations appropriate for the significantly more complex and dynamic multi-dimensional, on-line virtual world. When the enhanced virtual character is presented on the computer screen it continues to be controlled by the game player through command inputs at the keyboard or other input device coupled to the computer, but can now act within a dynamic, interactive, multi-player virtual world on-line. This multi-player virtual world includes at least a second enhanced virtual character controlled by a second player and the virtual characters are able to interact with each other as well as with elements in the environment of the virtual world that may not have existed in the portable game playing unit defined world.

Additionally, because the virtual characters of the present invention each have, independently from the other, at least one characteristic that can be changed through game play and because these changes can affect the play or appearance of the characters within the multi-player virtual world, the web server includes software programming the computing mechanism to send a message that includes the changed characteristic or characteristics to the computer or the portable game playing unit for storage and subsequent processing and delivery within each operating environment. The web server also is able to receive a message from the computer or the portable game playing unit that includes the at least one changed characteristic so that the changes will persist on-line after the character has translated off-line. These changes are also maintained in the memory of the portable game playing unit when the unit is turned off. The same is true for any data identifying a specific virtual character and for distinguishing it from any generic characters that have not be named, identified, purchased or owned by a game player.

Further, the web server can be programmed within the teachings of the present invention to authenticate requests received from the portable game playing unit via the computer before allowing access to the one or more of the virtual world resources available on-line.

In yet another aspect, the present invention is of a method for causing a virtual character to change its functional and visual characteristics through game play and to translate these changes and any updates thereto to and from a virtual world while persistently maintaining these changes and updates in association with the virtual character. The method includes the steps of providing the portable game playing unit with a computing mechanism including software for generating and identifying a virtual character and for on-line interfacing with a computer network to translate the virtual character from the portable game playing unit to the computer network and back, optional read only memory which could be used for storing at least the basic characteristics of the virtual character, and preferably at least one megabyte of executable flash memory for storing changes to the characteristics of the virtual character, connecting the portable game playing unit to a computer which is operatively coupled to a computer network having a second computing mechanism including software for generating and presenting an updated version of the virtual character on a computer screen connected to the portable game playing unit, and delivering data identifying the virtual character and defining one or more changes to a virtual character's characteristics from the computer network to the flash memory of the portable game playing unit.

Thus, utilizing the teachings of the present invention by providing software programming the portable game playing unit computing mechanism, the computer and the computer network server, the game of the present invention is able to function such that when the portable game playing unit defined and generated virtual character translates from the portable game playing unit to the computer or the computer network and back to the portable game playing unit in response to commands input to the computer or the portable game playing unit by a player, any data in the memory or flash memory defining a change to a characteristic of the virtual character is delivered with the virtual character with each translation. Moreover, when translated to the computer or computer network the virtual character is then generated and presented in animation sequences that are appropriate for the features and elements defining the computer network generated virtual world.

In another aspect, the invention is of a method for an interactive electronic game that involves at least two game playing units. The first game playing unit may be a handheld portable game playing unit with a computing mechanism such as a processor for generating a virtual character and a relatively simple display screen for displaying the virtual character using simple rendering such as 2D rendering and 2D scenes and action. The second game playing unit may be a general purpose computer such as a personal computer, which may further be connected via the Internet or other computer network to a server that generates a graphically rich 3D on-line virtual world. Together the computer and the server can constitute a second game playing unit. In response to a command from the user input to the portable unit, the virtual character takes an action within the 2D world that also changes or updates at least one of its characteristics, which could be, for example, an ability such as fighting ability or an appearance such as a hair style or clothing. The portable unit may be played by the user in a standalone mode in which the unit does not need to be connected to the computer for play to occur. One or more characteristics of the virtual character may be updated in response to the standalone mode play. For example, the character could acquire and put on an article of clothing. When the portable device is cabled or otherwise operatively connected to the computer, in response to a command from the user, or more generally in response to game progression, the virtual character translates to the computer with its updated characteristic, and interacts in the on-line virtual world. The first computer and the server are further connected via a network connection to a second computer which constitutes a third game playing device, through which another user similarly controls another virtual character, with a number of such characters interacting together in the 3D on-line virtual world. A number of different portable units could be sold, each with its own respective character, so that a wide variety of characters having different attributes and characteristics can meet and interact in a multi-user role playing environment.

Exemplary embodiments of the present invention will be further described below with reference to the drawing Figures, in which like numbers refer to like parts.

DETAILED DESCRIPTION OF THE EXEMPLARY EMBODIMENTS

Figure 1:
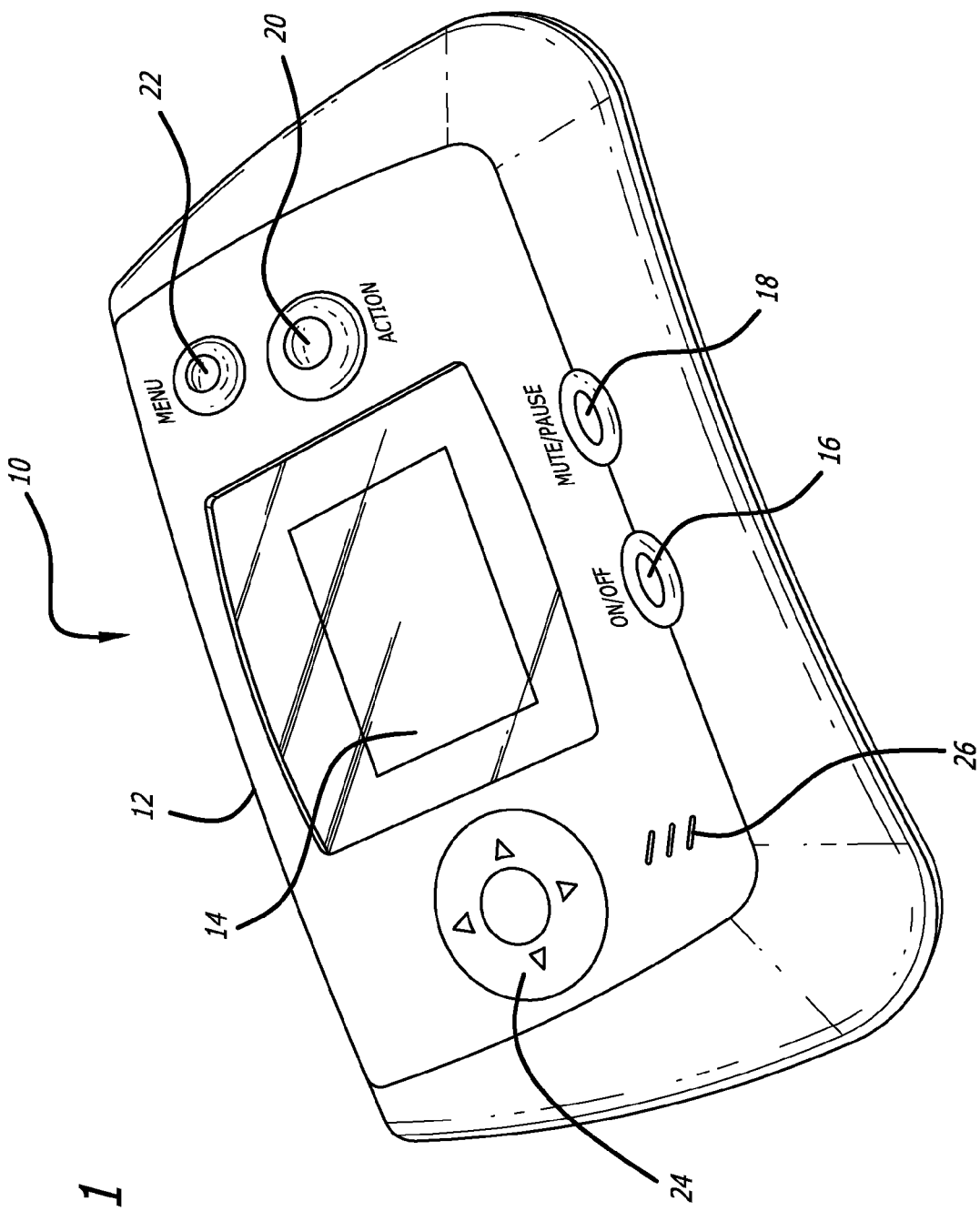
FIG. 1 is a perspective top view of an exemplary portable game playing unit illustrating the features of the present invention.

In the following detailed description of exemplary embodiments of the present invention, various details are set forth in order to provide an understanding of the invention. It will be appreciated by those skilled in the art, however, that the invention may be practiced without these specific details. In other instances well known methods, algorithms, procedures, components and circuits have not been described in detail so as not to unnecessarily obscure aspects of the present invention. Further, the present invention utilizes computer software, scripting, and digital animation for which a person of ordinary skill in the art of computer software and computer networking and design, utilizing the teachings of the present invention, will be able to write software or create scripts and animation that will implement the features and elements of the present invention.

In contrast to the prior art, the present invention provides the user of an electronic game, in other words, a "game player" with a single electronic game that can be played on a portable handheld game playing unit having relatively simple user input controls and on a higher order computer or Internet driven virtual world. The electronic game of the present invention originally is presented and operates within a flat panel display in two dimensions (in "2D") where the game player/owner can name and identify the virtual character defined and generated therein as well as customize its features and characteristics.

The portable game playing unit also has the ability to connect to the Internet through a computer (known in the art as "going on-line") where the game will reversibly translate its user controlled virtual character or characters to a higher order on-line virtual world. Moreover, when translated on-line the virtual characters of the present invention are altered in form, appearance, and nature in a manner that allows the virtual character to function in a familiar or known, player controlled manner, yet also to look and function appropriately and effectively in three dimensions (in "3D") with the added element of depth acquired in the translation from the portable game playing unit. This higher order translation is reversed when the virtual character translates back to the portable game playing unit. However, any changes to the characteristics of the virtual character persist in translation.

The virtual character moves from the display of the portable game playing unit and the 3D on-line virtual world on the computer screen and back in response to game progression. As used herein, the term "game progression" includes broadly any event related to the game and its play including input play commands from a user that has the direct or indirect affect of moving the character between the portable unit and the computer display, or in response to events which are generated by the computing mechanism within the portable unit or by the web server which generates the on-line world, or in response to a command from the user to close a browser window or shut down or power off either the portable unit or the computer.

In the preferred embodiment it is contemplated that when the virtual character translates from the portable unit to the on-line virtual world and back, the virtual character will cease being displayed on one display and will begin being displayed on the other display. The character therefore effectively moves between displays and their respective computing mechanisms, and thus it can be said that the character moves or migrates from the portable unit to the on-line world on the computer and back again. However, it is not strictly necessary that when the character translates or moves to a different screen that the character actually disappears from the prior screen. Additionally, it will be appreciated that the virtual character need not appear exactly the same on both displays. Indeed, due to graphical limitations of the portable unit display and possible variations in rendering, the character would probably appear slightly differently as it moves from one display to the other, but would still be recognizable as representing the same virtual character. Other variations in are possible, such as the character putting on special 3D glasses as it moves to the 3D world, or putting on special clothing, or changing shape or color as it moves from one display to the other. All such variations and similar or equivalent variations are contemplated as being within the scope of the present invention in which a virtual character moves or translates from one game playing unit to another game playing unit.

It is not strictly necessary in the practice of the invention that the two hardware devices be a portable unit that generates 2D graphics and animation, and a web server coupled to a client computer over a network such as the Internet and that generates 3D graphics and animation. Other types of hardware are possible. For example, instead of being a portable handheld unit, the first unit could be a freestanding video game unit, or a desktop computer running standalone game software. Similarly, the second unit could be nearly any type of game unit. Still further, the first unit could generate 3D graphics and animation, although in the presently preferred embodiment the first unit generates only 2D graphics and animation in an effort to make the unit more widely affordable. Although the second unit could theoretically generate only 2D graphics and animation, due to the relatively low cost of server computing power the web server in the preferred embodiment generates relatively rich 3D graphics and animation. Many variations are possible as will be appreciated by those skilled in the relevant art from reading the disclosure of the present invention. Throughout this disclosure the terms "2D" and "3D" will be used for the sake of convenience and shorthand to refer to the graphics displayed on the portable unit and the graphics displayed on the computer screen operatively connected to the web server according to the illustrative embodiment. This use of the terms "2D" and "3D" for convenience and shorthand sake should not be construed as limiting in any way the breadth or scope of the present invention.

It should be emphasized that the present invention does more than simply move or transfer the virtual character from one game environment to another. Instead, the present invention "translates" the virtual character to alter the form, appearance, and nature of the virtual character from the exemplary 2D virtual world of the portable game playing unit to the exemplary higher order 3D virtual world of the computer driven Internet environment. As a result, when on-line the virtual characters of the present invention are generated and presented in 3D with enhanced visual features including shading and depth along with the ability to act and move in three dimensions. When the characters translate back to their respective portable game playing units this process is reversed and the characters are generated and presented in the portable game playing unit to look and function appropriately in two dimensions while retaining any changes to their characteristics that they acquired while in three dimensions. As those skilled in the art will appreciate, when translated back to 2D, some characteristics including possessions and abilities may have to be altered to adapt to the limitations imposed by removing a higher order feature such as a third dimension in order to operate in a flat, 2D world.

Thus, when on-line a virtual character of the present invention is visually and functionally enhanced in a manner to include all the appropriate virtual character features, elements, and characteristics for whichever type of higher order on-line operating environment it is in. In this exemplary embodiment the higher order changes involve switching from 2D to 3D and back. However, it is within the scope of the present invention to have higher order translations involving something other than added dimension. For example, a virtual character might translate to or from a virtual world having gravity or no gravity. In this manner, the present invention provides a game player with a portable game playing unit generated 2D virtual character that also can translate to be generated and function in a persistent, yet ever changing, 3D virtual world hosting a massively multi-player on-line role-playing game where other individual players controlling their own virtual characters at locations remote from one another can participate, interact, and compete with one another on-line, simultaneously.

As a result, the present invention provides a game player with a full color, interactive, user controlled, virtual character that can leave the 2D portable game playing environment and enter a 3D virtual world on-line where other user controlled virtual characters can interact with each other and with the game playing environment to, among other things, explore, play games, compete, solve puzzles, chat, and acquire possessions that can be used, sold, or traded between virtual characters and that will translate back to the respective 2D handheld or portable game playing units defining each virtual character. In other words, the present invention provides an electronic game where 2D game unit defined virtual characters can change their individual characteristics through 3D interaction on-line and bring these changes back to the respective 2D portable game playing units. These enhanced and modified characteristics are translated to function in 2D so that the characteristics and changes persist in the portable game playing units and will translate with the virtual characters to and from the 2D and 3D environments.

Moreover, the game playing units of the present invention are not restricted to solo or one user game play when not connected on-line. Instead, because the portable game playing units of the present invention are provided with one or more communication ports such as wireless infra red (IR) ports or USB ports they can communicate with other portable units and interact with their respective 2D characters on each other's displays as well with computer networks defining 3D virtual worlds, to chat, compete, practice, train, share, and engage in other activities that may change, modify, or enhance one or more of their respective individual characteristics.

Whenever a respective virtual character learns or acquires a new or changed characteristic, skill, or possession through individual or interactive game play, the changes will "persist" or stay with the respective character, even when the portable game playing unit is turned off or the character is interacting with another game playing unit. The same is true on-line when the virtual character is interacting in 3D with many other virtual characters. Any changes to the character's individual characteristics made while playing on-line or linked to other game players, or even during solo play, will persist with the character when it is generated and presented in the portable game playing unit or when it translates back into 3D or connects with another portable game playing unit.

Thus, with the unique capabilities of the present invention, changes to a virtual character's characteristics, possessions, or even new characteristics that develop through game playing use and through interaction with the virtual environments and with other user driven virtual characters in either the 2D or 3D game operating environment will persist and translate with the virtual character each time it translates to or from the portable handheld operating environment to the computer or Internet environment. In this manner, the present invention provides the game player with a virtual character or companion that can learn through experience, be trained, and modified to develop its functions and capabilities in new directions as well as to acquire or dispose of items and possessions in either the portable 2D virtual world or the higher order or 3D on-line operating environment and these changes and acquisitions will persist with the virtual character whenever it translates to the other operating environment or back.

In a broad aspect, the present invention accomplishes these beneficial results with a game system that includes a portable game playing unit having a relatively inexpensive, yet full color 2D visual or video display such as a liquid crystal display or LCD. Exemplary portable game playing units within the scope and teachings of the present invention include handheld units having sufficient memory and processing capabilities to be specifically dedicated to a single electronic game or to multiple electronic games, cellular or wireless telephones, personal digital assistants ("PDAs"), laptop computers, portable video players, portable TVs, electronic musical instruments, and the like, as long as the portable unit has a video display and at least one player input control, preferably four or more toggles or buttons or a touchscreen, a computing mechanism and software for generating a virtual character on the display, and a communications port for connecting the portable game playing unit to a computer having a video screen of its own.

When the portable game playing unit is connected to the computer, preferably the computer is coupled to a computer network of multiple users which can be a limited private internal network or "intranet" like that of an office or group of friends or an external network such as the Internet, a global network of remotely located linked computers numbering in the millions. The game system of the present invention also includes a server or web server that is typically a computer with an operating system and specific server software enabling the server coupled to the computer network to process requests and to deliver and receive data from the other computers connected to the network and that is programmed to generate and present a portable game playing unit defined virtual character in higher order animation on a computer screen linked to the portable game playing unit.

The software of the present invention game system includes additional software programming at least the portable game playing unit computing mechanism and the server, and, if desired, the connected computer such that the virtual character of the portable game playing unit will visually translate from the portable game playing unit display to the computer screen and back to the portable game playing unit display in response to commands input to the game system by the player. When the virtual character translates from the game playing unit display to the computer screen it actually leaves the display by, for example, walking out of the display and onto the computer screen in its altered or translated form, or by going on vacation from the portable game playing unit and flying onto the computer screen while the on-line connections and processing are completed and then entering the higher order on-line virtual world once this is done. In this manner the electronic game of the present invention provides the game player with a seamless visual translation from the 2D portable game playing unit virtual world to the higher order or 3D server generated on-line virtual world.

For example, in accordance with the teachings of the present invention, when the virtual character moves from the flat, 2D world of the portable game playing unit display where it can move side-to-side and up-and-down, to the 3D virtual world of the on-line massively multi-player role-playing game the visual presentation of the virtual character is expanded in quality and character to include the added dimension of depth so that while it is displayed on the computer screen the game player can make the virtual character act and move in three dimensions including moving into and out of the visual field presented on the screen as well as side-to-side and up-and-down.

Further, the virtual character exhibits enhanced 3D visual characteristics including shading and depth as well as more complex 3D movements as it operates within the 3D on-line virtual world and interacts with the virtual world environment and with other 3D virtual characters in the massively multi-player on-line role-playing game. What is more, because the web server defined virtual world is much richer and dynamic that what is possible in the 2D world of the portable game playing unit, additional and unique opportunities are available on-line that are not available in the portable game playing unit. These additional opportunities can include updates, new virtual characters and other software downloads that can expand and enhance the characteristics, features, and abilities of a virtual character.

When the virtual character translates back to the original operating environment generated by the portable game playing unit and returns to the 2D perspective of the game playing unit display the higher order translation to 3D is reversed and the virtual character visually translates back into 2D with the appropriate visual characteristics and abilities to act and move in the limitations of a flat 2D world. When viewed on the 2D display the exemplary virtual character appears flattened, without perspective or depth and is limited to relatively simple left-right, up-down, or diagonal movements on the display. There it can enter and leave specific rooms or spaces in 2D through doors or passageways, open doors, closets, cupboards and the like, and select and return items that it can use or activate. It also can play games, eat, sleep, go places, and train, learn or acquire skills through game play in 2D.

When the first virtual character of the present invention is on the computer screen, the character acts within the higher order computer web server defined and generated multi-player virtual world according to commands input by the player into the portable game playing unit or, in the alternative, into the connected computer. The same is true for any other virtual characters acting in the multi-player virtual world on-line. Each of these additional game characters is controlled on-line by a second or an additional game player inputting commands into his or her respective portable game playing unit. While the virtual character is active in the multiple-player virtual world on-line it technically is inactive within the portable game playing unit. The way to reactivate the virtual character of the present invention within the portable game playing unit is to contact on-line and synchronize with the web server to transmit or "re-flash" character defining data to the portable game playing unit.

One of the added benefits that makes playing the electronic game of the present invention so rewarding for the game player is that the virtual characters of each game playing unit have at least one characteristic that can change during play of the game in either the 2D or the 3D world and that will persist with the respective virtual characters as they translate to and from the 2D portable game playing unit to the 3D on-line world and back. Characteristics can be changed with the present invention in a variety of ways including, without limitation, player controlled training of the virtual character, in effect, the character learning within the portable game playing unit or when on-line, or by the virtual character acquiring, earning, or receiving additional possessions or software downloads, or by using up, giving away, or otherwise disposing of possessions, or by the character changing physical appearance such as by visiting a salon and receiving a new haircut.

Similarly, in either the 2D or 3D game playing environment the characteristics of a virtual character can be changed through interaction with another virtual character controlled by a second game player through a second portable game playing unit either on-line or within linked portable game playing units. These interactions include, without limitation, things such as training, sharing, trading, competing, game playing, or combat. For example, a virtual character can earn medals through combat that will have hidden properties that add to the character's functional abilities or it can search for and find treasures with similar properties. Exemplary changeable characteristics can include, without limitation, at least one of a virtual character's physical abilities such as interests, training, learning, memory, strength, mobility, flexibility, and fighting, happiness, boredom, sleepiness, thirst, hunger; and, at least one of a virtual character's possessions such as food, water, credits, money, clothing, accessories, medals, and tools.

The present invention makes this possible by providing the game system with a non-volatile memory such as a flash memory or database in the portable game playing unit for receiving and storing changes to the characteristics of the virtual character and for delivering or receiving these changes or updates to the varying characteristics along with the specific identity of the virtual character whenever it translates between the 2D or 3D worlds or when the portable game playing unit is turned off or put into a "sleep" mode where the unit is on, but inactive. This memory or database and the associated software can be distributed between the portable game playing unit and the web server so that each component of the game system can generate and present the specific virtual character with all of its characteristics in animation sequences appropriate for the respective game playing environments as directed by the game user.

The changeable characteristics of a character may be represented by a series of numerical values. Those values can include, for example, how hungry, happy, or bored a character is on a numerical scale such as 0 to FF hex, and which items a character possesses represented by a series of numerical codes, with each different code value representing a different item such as a shirt, a sword, etc. The changeable characteristics of a character are therefore represented by a set of parameters which may be stored in a parameter table. The parameters are stored in non-volatile memory such as flash EEPROM within the handheld unit. When the character moves to the on-line world, the software in the handheld unit, the computer, and the web server cooperate to copy the parameter values from the handheld unit's flash memory to the web server. The web server then uses those parameters as appropriate in visually generating the character, and in controlling game play. Typically although not strictly necessarily, during the character's adventures in the on-line world the character's characteristics will change, i.e., the parameters will be updated. When the character exits the on-line world and returns to the handheld unit, the updated parameters are passed to the handheld unit and stored therein within the flash memory. In other words, the handheld unit and the web server are synced. The character may exit the on-line world and return to the handheld unit by a number of methods, such as the character walking through a specific doorway, or by the user pressing a predefined command button, or simply closing the browser application. The details of syncing a portable device to a computer or a web server are well known, and a person of ordinary skill within the applicable art would be able to write software to implement the necessary functions. When the character returns to the portable unit, because the updated parameters are passed from the virtual world's server to the portable unit and stored in non-volatile memory, the updated characteristics persist even after the portable unit is powered down.

An exemplary portable game playing unit illustrating the principles of the present invention is shown in FIG. 1 generally indicated by reference numeral 10. Those skilled in the art will appreciate that the portable game playing unit of the present invention is not limited to that shown and described herein. Alternative sizes, shapes, features and elements are within the scope of the present invention and may be selected as deemed appropriate for the intended audience. For purposes of illustration and explanation the embodiment of the present invention shown in FIG. 1 is intended as a children's toy or game targeted to 6 to 12 year old boys and girls.

Though different children can each utilize their own identical portable game playing units 10 to play the exemplary children's game embodiment of the present invention or to interact with each other when linked or on-line, due to the ability of the present invention to differentiate and modify individual virtual characters, it is also contemplated as being within the scope of the present invention to design and produce different interacting portable game playing units having essentially the same features and operations but with different graphics targeted to either boys or girls or both, or to provide different characters to each intended audience so that individual game players can individualize their characters and differentiate themselves from each other.

For example, in an animal game targeted to both boys and girls the individual game playing units can define and generate a dog character or a cat character which can be selected for use and purchased by a boy or a girl game player. Alternatively, a girl's game could be produced with individual portable game playing units defining a blond girl, a brunette girl, or a redhead, or girls of different races and ethnicities. A boys game could be produced having virtual characters that appeal to boys such as monsters or machines.

In FIG. 1, portable game playing unit 10 is a shown as a generally rectangular housing 12 configured to be manipulated or held by both hands of a game player or to be set upon a flat surface or table. Housing 12 is provided with a display panel 14. Display 14 is shown as a flat panel liquid crystal display or LCD display, though it is contemplated as being within the scope of the present invention to provide portable game playing unit 10 with any of a wide variety of flat panel video displays that are or will become available and that can provide at least a two dimensional image for the game player to view. As richer graphics generating capabilities and displays become more economically feasible for the portable game playing unit 10, those more advanced graphics and displays can be substituted.

Preferably, display 14 will be a full color video display, though black and white or even high definition digital video displays may be utilized to practice the present invention. Exemplary display 14 is a low-cost color display based on a two bit grayscale per pixel and is appropriate for young children to use and enjoy. However, higher resolution video displays may be utilized and it is also within the scope of the present invention to provide more expensive or higher resolution displays as well as more than one display 14 in portable game playing unit 10.

Also shown in FIG. 1 are a plurality of exemplary user input controls distributed about the face of housing 12 and respectively designated 16, 18, 20, 22, and 24. Input control 16 is a simple on/off switch enabling the game player to turn portable game playing unit 10 on or off. Input control 18 is a mute/pause switch enabling the game player to switch audio output on or off and to pause or restart game action as appropriate to various phases of game play. Input control 20 is an action button which the game player can press at appropriate times during game play to make a virtual character act on or operate an item or function such as opening a door, choosing or buying an item, eating, sleeping, or making a game move in a game like tic-tac-toe. Input control 22 is a menu key that a game player can use to bring up varying option menus within the game, before, during, or after game play to input different choices and selections. Input control 24 is a joy pad through which a game player can input directional choices and movements, or select from lists, as well as other operations requiring navigation through a variety of choices much like a conventional joystick on a computer.

Though five user input controls are illustrated in this exemplary embodiment of the present invention shown in FIG. 1, it is within the scope of the present invention that additional or fewer input controls may be utilized in portable game playing unit 10. For example, display 14 may be provided with a touch screen user interface enabling the game player to input a variety of commands into portable game playing unit 10 through icon driven techniques involving pressing on different choices presented on display 14. In this manner many of the alternative user input controls shown in FIG. 1 can be eliminated, replaced, or added to. Alternatively, portable game playing unit 10 can be provided with internal motion sensors (not shown) to respond to moving portable game playing unit 10 in different directions to make control inputs by tilting or shaking portable game playing unit 10 in different directions.

In FIG. 1 portable game playing unit 10 is shown having an optional audio feature designated as audio out 26. Audio out 26 is an opening in the face of housing 12 configured to allow sonic waves generated as part of the game being played in portable game playing unit 10 to pass out of housing 12 into a game player's ears. In this exemplary embodiment of the present invention the sonic waves are generated by a piezoelectric device, although other sound generating devices as well as other locations or opening designs may be utilized within the scope of the present invention. For example, exemplary audio can be produced utilizing 44.1 Khz 16 bit stereo .WAV files, the type of audio found on CD's. Alternatively, using 4 or 5 bit mono samples at 8 hz is possible and may be appropriate for the present invention. Audio out 26 also may include a headphone jack or a connection to external speakers within the scope of the present invention. An audio mute function may be provided so that the user can turn off audible sounds emanating from the device.

Portable game playing unit 10 also is provided with a communications port and an IR port. For example, 38 khz Infrared receivers and emitters transmitting at a bit rate of 1000 bps using existing formats may be used in accordance with the teachings of the present invention for the IR port. Similarly, commercially available USB ports, connections, and the like may be used as a communications port and are intended to function in connection with existing connecting cables.

Preferably, the USB and IR ports are located on the back or sides of housing 12 so any USB connections or cables are conveniently available, but remain out of the way and thus are not shown in FIG. 1. The USB port may be covered or refracted when not in use to reduce the chances of contamination or damage. The USB port is for connecting to a portable computer (not shown) having its own screen, as known in the art. Placement of the IR port on the back of sides of housing 12 allows a wireless IR line of sight connection to be established between two game players each holding the respective portable game playing units 10 and simply facing each other.

In this manner, portable game playing unit 10 can communicate with a computer or with another portable game playing unit in order to interact with additional virtual characters available therein or on-line. To achieve these functions, portable game playing unit 10 is provided with a computing mechanism located inside housing 12 and including an executable flash memory, preferably at least one megabyte, and a read only memory, preferably at least 512 kilobytes, and software. The read-only memory will contain at least the shared code, bootstrap routines, and common sound effects for the virtual characters and for game play. The flash memory will contain at least some of the audio, artwork, and character specific data. Standard data types and associated values along with main character variables and their associated values as well as classes and types of items can be developed by those of ordinary skill in the art in combination with the teachings of the present invention. The same is true for any animated sequences or scripts that are required for the visual and audio display of the game in the portable game playing unit.

The software provides the programming for executing the steps of the present invention including defining, identifying, and generating a first virtual character on display 14 and to provide on-line interfacing through the connected computer, itself coupled to a computer network, and through unit-to-unit interfacing between IR linked game playing units. The software provides the programming to provide the first virtual character with the ability to translate out of portable game playing unit 10 display 14 and on to the computer screen, or back to portable game playing unit 10 and into display 14 in response to commands input by a game player or other game progression. When linked to another portable game playing unit 10 the first virtual character is presented on the display 14 of each linked portable game playing unit and remains under the control of the game player. The same is true for the second virtual character of the linked second portable game playing unit.

In contrast, when translated into the computer screen, web server software identifies and generates the virtual character in higher order animation within a multi-player web server generated virtual world including at least a second virtual character, yet the first virtual character remains controlled by the first player. The second virtual character is controlled by the second player at a remote location using a second personal computer and/or portable game playing unit. Similarly, the virtual world may simultaneously be populated by many characters controlled by respective players at respective remote locations, with interactions possible between and among all of the characters. The virtual world may also be populated by various characters whose actions are controlled by human moderators, or by the web server software rather than by humans.

In the preferred embodiment, the user's computer includes a special purpose browser application program that has been downloaded to the user's computer from the game provider's website. The web server then controls the graphics on the user's computer screen by generating and sending to the user's computer via the Internet the commands to the browser program to generate the virtual world graphics and animation on the screen, in a client-server relationship. Additionally, the web server software sends graphics and data files to the user's computer as the user's computer requests those files. Those graphics and data files may be downloaded as the user is playing the game on line. For example, when a character moves within the virtual world from a first room to a second room, the user's computer will need the graphics data for generating the second room, so the user's computer requests the necessary file(s) at that time from the web server.

The software of the present invention also is programmed such that the virtual character of portable game playing unit 10 has at least one characteristic that can change during play of the game. Each respective change to the at least one characteristic has the ability to affect the play of the character within portable game playing unit 10 or within the computer.

In this exemplary embodiment of the present invention, individual character characteristics, including any changes to those characteristics, are stored in the flash memory of portable game playing unit 10. The software in portable game playing unit 10 also is programmed to send or deliver any updated or changed characteristics along with the virtual character identifying data to the connected computer and thereby to the server coupled to the computer network whenever the virtual character translates to the on-line virtual world, and to receive any changes to a characteristic whenever the virtual character translates back to portable game playing unit 10.

Additionally, the flash memory remains stable when portable game playing unit 10 is turned off or when the virtual character becomes inactive or goes into a sleep mode so that changes to any virtual character characteristics remain or "persist" with the virtual character wherever and whenever it operates. If desired, the software can be programmed to restore default characteristic settings by resetting or rebooting the game or portable game playing unit 10.

In this manner the present invention provides a game system where each individual handheld or portable game playing unit 10 defines and through user input operates or controls one or more respective user controlled virtual characters. These characters can be operated in the portable game playing unit game environment or can be translated from the portable unit to a computer driven or on-line Internet driven game environment, along with all persistent identification, training, possessions, and other characteristics and features that will be received, identified and stored by the web server enabling the web server to generate and present a higher order animation virtual character on the computer screen.

Figure 2:
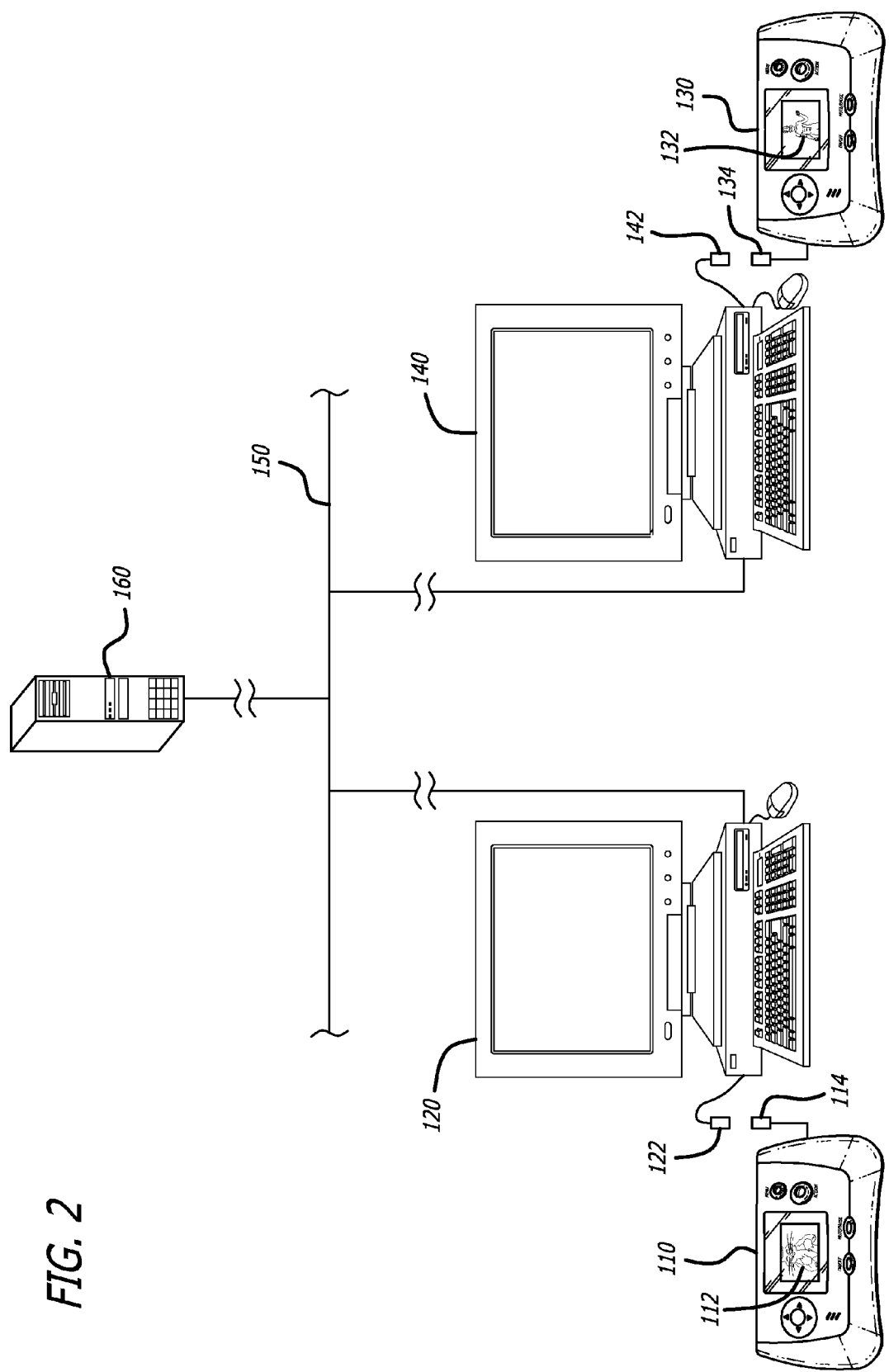
FIG. 2 is a system diagram illustrating portable game units being played in a standalone mode.

FIG. 2 is a system diagram illustrating portable game units 110 and 130 being played in a standalone mode. First unit 110 has a first virtual character 112, shown as a animal character, associated therewith and second unit 130 has a second virtual character 132, shown as a monster character, associated therewith. In the illustrative embodiment units 110 and 130 have the respective characters 112 and 132 programmed into the units so as to be resident in the unit as those units are purchased by the consumer from a retail toy store. In the standalone mode, the unit need not be cabled to a computer, as illustrated by USB connectors 114 and 134 not being connected to the computers. In standalone mode each player manipulates the various controls associated with his unit to play various games and activities involving his virtual character.

Figure 3:
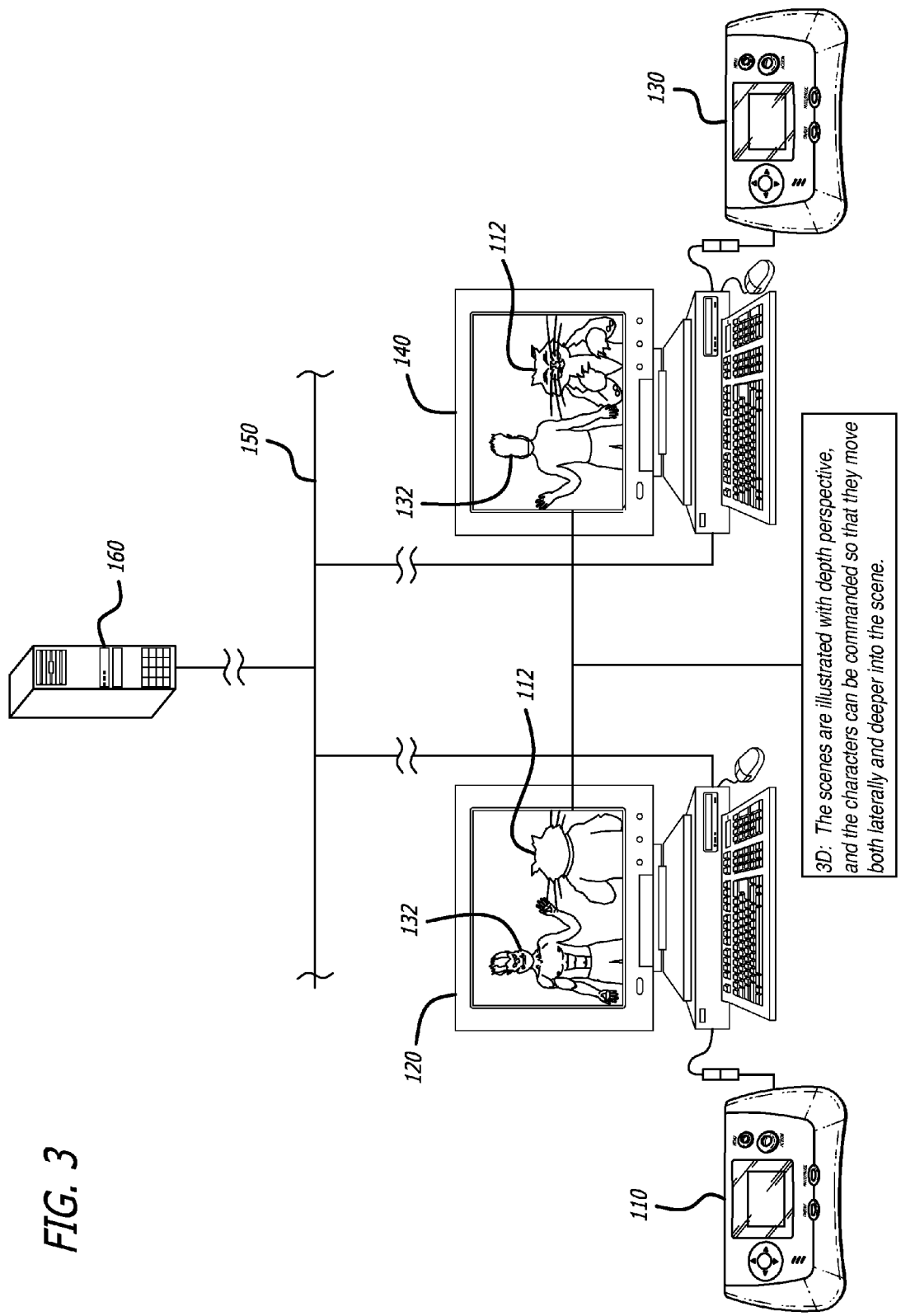
FIG. 3 is the system diagram of FIG. 2 but with the portable game units cabled to network-connected computers and the virtual characters having translated from the portable units to the computer screens in a multi-player on-line virtual world.
Figure 4:
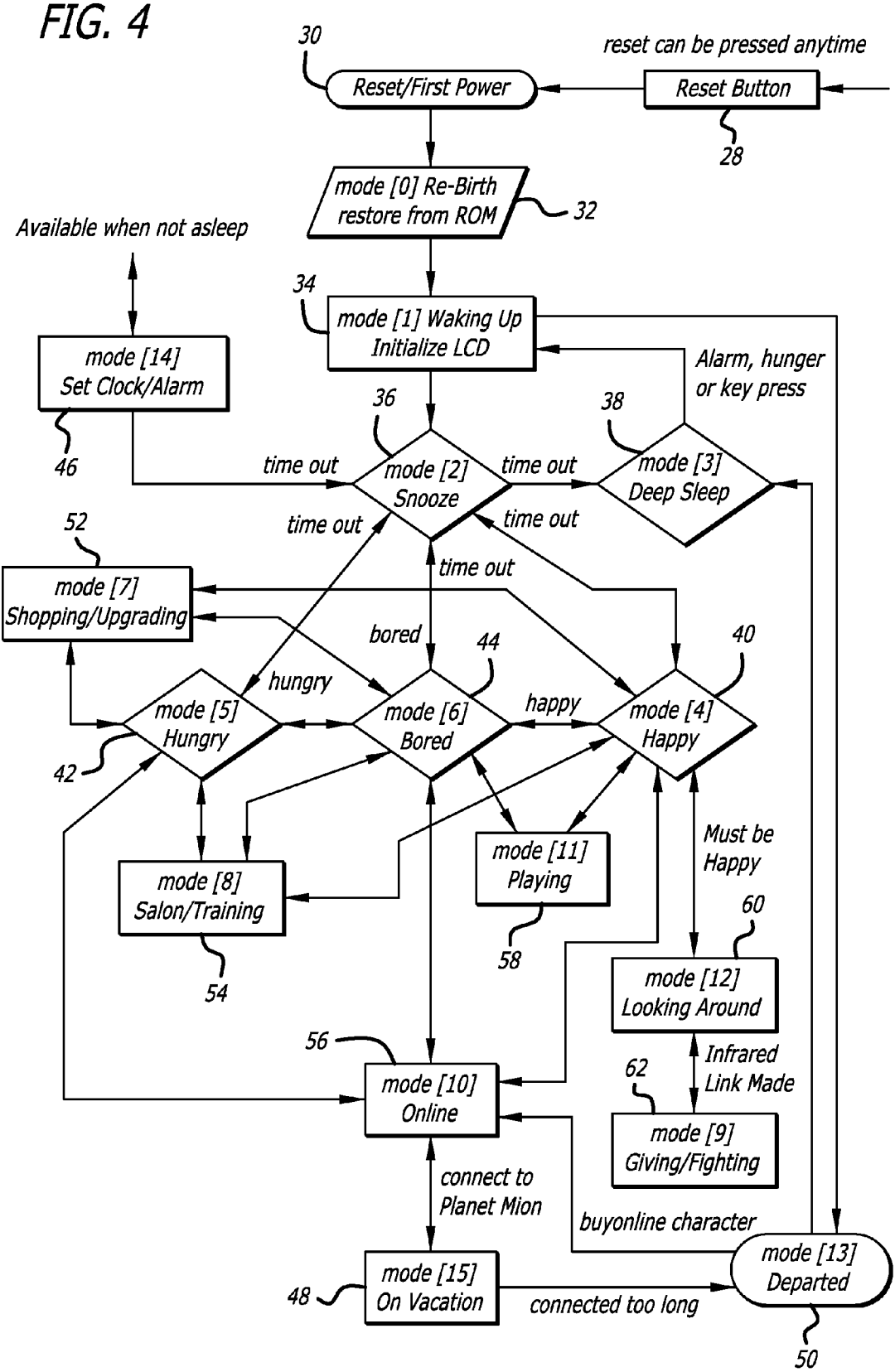
FIG. 4 is a flow chart illustrating the features of an exemplary portable game playing unit defined character of the present invention.

FIG. 3 is the system diagram of FIG. 2 but with the portable game units 110 and 140 cabled via game unit USB ports 114 and 134, respectively, to USB ports 122 and 142, respectively, of computers 120 to 140. Those computers are also connected to network 150 such as the Internet which is a global computer network. Web server 160 is also connected to network 150. As illustrated in the figure, the virtual characters having translated from the portable units 110 and 130 to the display screens of computers 120 and 140, where the characters inhabit the multi-player on-line virtual world. Preferably each computer screen shows the virtual world from the perspective of the particular character to more completely personalize the on-line play experience. Thus, server 160 generates two different versions of the on-line world and sends those two versions to the respective players' computers. The on-line world can include any number of players and avatars, acting all within one room or within various rooms and virtual areas, within as complex and rich a virtual world as desired, within the computing capabilities of the server and the data throughput capabilities of network 150 and its various connections. In the figure, virtual characters 112 and 132 are shown on the computer screens and appear to have left units 120 and 140 completely, although it is not strictly necessary that the virtual characters disappear, or disappear completely, from the handheld units when they appear within the virtual world and interact therein.

When on-line the game player can continue to control the virtual character originally generated and defined by his or her portable game playing unit and now generated by the web server with the same or similar inputs and commands the game player is accustomed to through the portable game playing unit or through corresponding control inputs through the computer. There the virtual character will not only look familiar, though appropriately modified or translated for the higher order operating environment, but will act in a familiar and recognizable manner even though it will possess higher order functions and abilities. As a result, the game system of the present invention makes it possible for the game player to operate a game character in multiple electronic environments having different features and characteristics including higher order states and multiple dimensions without having to learn or relearn a new user interface in order to play on-line.

This provides the game user with a more rewarding experience than can be found with prior art electronic games. Rather than being restricted to operating in a limited 2D virtual world presented in a portable game playing unit flat display, users of the present invention can expand and enhance their gaming experiences by operating and controlling their originally game playing unit defined virtual characters in a 3D interactive virtual world populated with other independent characters controlled and operated by other individual game players using their own portable game playing units at remote locations throughout the nation or even throughout the world. In the higher order 3D interactive virtual world the game player is able to direct the specific virtual character to engage in a variety of activities and challenges that are not available within the portable game playing unit and that can add additional enhancements to the specific virtual character that will translate back to the portable game playing unit.

Adding to that experience, the exemplary game system of the present invention is programmed so that when the virtual character translates from portable game playing unit display 14 to the computer screen the virtual character visually walks off, out of, or leaves the 2D display and translates into 3D as it walks onto or enters the computer screen and into the 3D virtual world on-line. While this happens visually, the virtual character actually goes into a vacation mode within the portable game playing unit. As a result, when it translates from 2D to 3D the virtual character ceases to be displayed on portable game playing unit display 14 and subsequently is displayed only on the computer screen. Similarly, when the virtual character translates back from the computer screen to portable game playing unit display 14, the virtual character ceases to be displayed in 3D on the computer screen and is displayed only in 2D on portable game playing unit display 14. Though the individual changeable characteristics of the virtual characters of the present invention will be displayed differently when in 2D or when in a higher order state such as 3D, because the characteristics are persistent and translate with each character the specific characteristics persist with the character and are essentially identical whether or not the virtual character is active in the 2D portable world or in the 3D on-line networked world. Exemplary changeable characteristics within the scope and teachings of the present invention include, without limitation, at least one of the virtual character's physical abilities such as interests, training, learning, memory, strength, mobility, flexibility, fighting ability, happiness, boredom, sleepiness, thirst, hunger; and, at least one of the virtual character's possessions such as food, water, credits, money, clothing, accessories, medals, and tools. As an added benefit, it is also contemplated as being within the scope of the present invention to program the server software to not only manage, process, and respond to requests from the individual portable game playing units as well as from the computer network, but to authenticate a game player request before allowing the game player to access the multi-player virtual world or specific resources of the virtual world on the computer network. In this manner the present invention provides an added degree of security to the virtual world as well as to the privacy of the individual user data that may be accessible on the computer network.

An additional aspect of the present invention illustrated by the exemplary embodiment under discussion is a web server for playing the multi-player electronic game of the present invention on-line. The exemplary web server includes software that programs a computing mechanism to interact with one or more computers communicating with the web server computing mechanism. Each of these computers has a screen and is also connected to a portable game playing unit having a display for displaying at least one virtual character playing an electronic game.

The web server also includes a database or data repository to store or retain data relevant to playing the game of the present invention. The web server software programs the computing mechanism to manage and respond to requests and to deliver data to and from the database to and from the computer or to and from the connected portable game playing unit to allow the at least one virtual character to translate from the portable game playing unit display to the computer screen in response to commands input by a player. This translation includes the transmission of data identifying the specific virtual character as well as its changeable characteristics so that the web server software can identify, generate, and display the specific translated virtual character with its unique characteristics in a higher order animation format that is appropriate for the higher order on-line virtual world. The web server software also allows the virtual character presented on the computer screen to interact within the web server driven multi-player virtual world that include at least a second virtual character controlled by a second player.

The web server further includes software programming the computing mechanism to send a message that includes any changes to the characteristics of the virtual character to the portable game playing unit for storage and use therein so that they will persist when the game playing unit is turned off or the virtual character translates on-line. The software also is programmed to receive a message from the portable game playing unit that includes any changed characteristic of the virtual character so that these changes will persist and translate with the virtual character when it is on-line. These changeable characteristics include, without limitation, a virtual character's physical abilities such as interests, training, learning, memory, strength, mobility, flexibility, fighting ability, happiness, boredom, sleepiness, thirst, hunger; and, a virtual character's possessions such as food, water, credits, money, clothing, accessories, medals, and tools. Thus, in one aspect the present invention provides methods for allowing a virtual character defined by a portable game playing unit to change one or more of its characteristics through game play and to translate those changes to and from a virtual world. Such an exemplary method includes the steps of providing the portable game playing unit discussed above, connecting it on-line, and delivering the virtual character identifying data to the web server.

More specifically, the method includes the first step of providing a portable game playing unit with a computing mechanism including software for identifying and generating a virtual character of the game and that can interface on-line with a computer network to translate the virtual character from the portable game playing unit to the computer network and back. An exemplary portable game playing unit that will accomplish this includes a read only memory, preferably at least 512 kilobytes thereof, for storing the characteristics of the virtual character and an executable flash memory, preferably at least one megabyte thereof, for storing any changes or updates to the characteristics of the virtual character.

The second step includes connecting the portable game playing unit to a computer having its own screen and coupling the computer to a computer network such as the Internet having a second computing mechanism including software for generating and presenting an updated version of the virtual character on the computer screen. The third step includes delivering any updated data defining any changes to a characteristic of the virtual character from the computer network to the flash memory of the portable game playing unit.

In this manner it is possible for the virtual character of the present invention to develop and evolve through game play and to acquire changed, updated, or enhanced characteristics while on-line. Data encoding these modified characteristics are delivered to the flash memory so that they persist with the virtual character in either the portable game playing unit environment or on-line. These data are delivered with the virtual character each time the virtual character is translated to or from the on-line world.

To further enable a complete understanding of the present invention to those of ordinary skill in the art, a specific exemplary embodiment of the present invention designed for children will be discussed. The exemplary game is called MIUCHIZ™, designed, owned, and operated by MGA Entertainment, Inc. MIUCHIZ™ is a full color, totally interactive electronic game intended to be played by children. The game is played on a variety of individual portable game playing units, each unit defining its own virtual character. The virtual character of each individual portable game playing unit is designed to be a "companion" or friend that the game player can interact with, train, and share virtual experiences with. The virtual companions also can enter a family-friendly 3D virtual world on-line where children can have fun, play games, solve puzzles, chat, and interact with each other as well as further enhance the characteristics of their virtual characters.

More than just a game, MIUCHIZ™ is an educational tool featuring "train and feed them play" that teaches children cause and effect and how to be responsible and accountable for their actions as they take care of their virtual companions. In the exemplary embodiment of the present invention there are a plurality of functionally similar, but differently appearing portable electronic game playing units featuring different graphics and different virtual characters designed to appeal to different game players such as boys, girls, or both.

For example, virtual characters specifically designed for game play by girls include young, fashion sensitive and contemporary female characters named "Bratz™" and can include specific characters such as "Cloe™" and "Yasmin™" with their own individual looks, personalities, and characteristics. Virtual characters specifically designed for game play by boys include individual monster characters named "Monsterz™" and specific characters named "Monsterz Fire™", "Monsterz Rock™", and "Monsterz Lure™". Virtual characters specifically designed for game play by either boys or girls include individual animal characters named "Pawz™" such as "Dash™", a virtual cat, and "Spike™", a virtual dog. Though having widely different visual appearances and characteristics, each individual virtual character generally shares the same underlying generic software structure and content to enable their interaction and compatibility with other portable handheld game playing units and characters as well as on-line in a multi-player virtual world.

MIUCHIZ™ utilizes a portable game playing unit configured like the unit shown in FIG. 1. The game goes into a sleep mode when not in use, but the virtual character can be woken up by the game player who then can interact with and care for it through game play. Each game player can customize, personalize, or stylize their virtual character through changes in clothing, accessories, and hair color, as well as through training and learning. Through game play, players can earn credits or money to make purchases of goods and services for their virtual characters. The portable game playing units maintain a real time clock that enables hunger, boredom, and sleep patterns for the virtual character to be followed by the game player to make sure that his or her virtual character is fed, well rested, happy and interested. It is necessary for a game player to attend to these responsibilities in order to allow the virtual character to engage in other activities that may be more rewarding.

When connected to the Internet the exemplary game is able to receive upgrades and other downloads as well as to translate its virtual companion into and out of the higher order 3D on-line world known as "Planet Mion™". Planet Mion™ is a computer generated rich and evolving virtual environment that continues to exist in real time even when the virtual companion character is off-line or asleep. Once on-line, game players are able to explore the varying scenery and environments of Planet Mion™, compete, play games, earn credits and training, as well as interact with other on-line MIUCHIZ™ characters. Additionally, Planet Mion™ includes an ongoing storyline about its mysterious origins that allows advanced game players to explore deeper into the mythology of MIUCHIZ™.

Each exemplary portable game playing unit 10 is provided with a menu accessible by pushing menu button 22 to display a full list of play options. These options include reviewing the contents of the virtual character's inventory of possessions, going to a mall or store to shop for upgrade or furniture, clothes, food, beverages, and the like, or going to a restaurant or a spa to eat or relax. Further, each exemplary portable game playing unit includes internal games that can be played by the virtual character under the game player's control on display 14. In the exemplary embodiment of the present invention these games include tic-tac-toe and rock-paper-scissors. Additional games are available on-line along with software upgrades.

The MIUCHIZ™ game has three different modes of game play, each using the same virtual character, which allow a game player to play alone, with friends, or on-line. In the single player mode the game player controls the virtual character that comes with and is defined and presented by portable game playing unit 10 on the 2D display 14. There the game player can direct the virtual character to choose and play one of the available games, to eat, sleep, check out inventory, enter and leave different rooms and locations, shop, relax at a spa, train, and engage in other activities. When the virtual character gets hungry or sleepy or bored, the game player must respond to those needs accordingly by directing the virtual character to eat, sleep, or entertain itself, whatever is necessary to be able to perform other activities. Failure to do so will prevent the virtual character from engaging in many of the available activities.

In the two player or linked mode the game player is able to wirelessly interact with one or more friends linked through the IR ports in their respective portable game playing units. There each virtual character is displayed on each linked portable game playing unit display 12 as appropriate to game play. When linked the virtual characters can participate in the same activities in response to the same game player control inputs as in the single player mode, but with the added capacities of linked two player mode including the ability for the virtual characters to share with and compete against one another in linked games. Each game player is able to independently control his or her virtual character as both linked characters are presented on both displays during linked interaction.

In the on-line mode a player's portable game playing unit is plugged into or connected to a computer through the exemplary USB communications port using a USB cable. After successfully completing an original on-line registration as well as a subsequent authorization procedure, the virtual character can translate out of the 2D display and into the higher order 3D virtual world of Planet Mion™, along with the virtual character's possessions and characteristics. There, the game player can direct the now 3D virtual character to explore Planet Mion™, play games to earn credits, download software and items to his portable game playing unit, personalize and stylize the character's appearance, eat, sleep, and interact with other characters by chatting, solving puzzles, playing games and through other forms of competition. Directions for these functions and the associated game player control inputs can be supplied by the portable game playing unit or the web server.

In accordance with the teachings of the present invention, each portable game playing unit is provided with a computing mechanism preferably having a central processing unit (CPU), along with memory including read only memory and flash memory, and software producing a software implemented virtual character having certain features, powers, abilities, and personality traits that can affect character movement through a series of interconnected operational modes which can be moved between with combinations of certain character states or events. These include "time out", personality or characteristic shifts, and external inputs such as portable game playing unit detection of USB insertion or input control button presses. With reference to FIG. 2, a generic flowchart for an exemplary virtual character is presented illustrating each mode and the common character data structure of the present invention. As those skilled in the art of software design will appreciate, numerical values are suggested for the implementation of these related character modes. In the exemplary embodiment illustrated, 8 bit values giving a range of unsigned integers of 0 to 255 are used when possible. Other alternatives within the skill of the art are within the scope and teachings of the present invention.

The details of individual portable game playing unit owners may be stored in the memory of the portable game playing unit to identify the units and the virtual characters. However, because the individual virtual characters have fixed basic characteristics and identifying features, naming of a virtual character involves retaining the name of the owner/game player rather than renaming the character itself. In order to allow changes to individual characteristics or enhancements to advancing virtual characters to be downloaded into the portable game playing unit, the character name should be stored in the flash memory to allow changes beyond those characteristics given by the read-only memory upon reset of the portable game playing unit.

As illustrated in FIG. 2, it is preferred that each portable game playing unit be provided with a reset button 28 that will enable a game player to restore the settings of portable game playing unit 10 to an earlier setting or to an original setting. Those skilled in the art will appreciate that reset button 28 should not be susceptible to inadvertent or accidental activation. Therefore, it should be placed on the back of housing 12 or required to be pushed in combination with another button or buttons so that only intentional reset is possible. Pressing reset button 28 can take place at any time during operation of the portable game playing unit and will initiate the resetting and first power up phase of the present invention illustrated in FIG. 2 at 30 as well as resetting the system values stored in the memory. In the exemplary embodiment of the present invention whenever fresh batteries are inserted into portable game playing unit 10 or reset button 28 is pushed the portable game playing unit configures itself as a new unit where character defining data is taken from the read only memory or the copy protected region of the flash memory, as designed.

After the game is powered up at step 30, it enters Mode 0 at step 32 where the virtual character is restored along with its individual characteristics and any changes or updates thereto from the read only memory in a rebirth process. From there the game proceeds to Mode 1 at step 34. The primary game function at Mode 1 is to initialize the LCD display memory and to set the CPU of the computing mechanism to full speed, readying itself for normal operation where portable game playing unit 10 is fully functional and capable of displaying animations, of detecting user input commands, and playing audio output.

Once the exemplary liquid crystal display 14 is initialized and the game unit becomes operational it proceeds to Mode 2 or the Snooze Mode at step 36 where portable game playing unit 10 is fully awake and operational but the 2D virtual character is shown visibly resting in its 2D surroundings on display 14. These animated 2D surroundings can include an animated bedroom with the virtual character asleep in a bed. At this point in the process of the present invention, a variety of options become available to the virtual character.

Snooze Mode 2 at step 36 is the entry point for many of the present invention's game functions and activities. For example, an earlier game playing mode may be resumed at this point if the virtual character went into Deep Sleep Mode 3 at 38 for power saving reasons. Snooze Mode 2 at 36 is the entry point to Deep Sleep Mode 3 at 38 from all other modes of the present invention when the virtual character has not been operated or interacted with for some time. Alternatively, if the virtual character has been asleep for some time it will change its preferred waking state to Snooze Mode 2 to reflect that it is deciding to go to bed because it was tired.

Deep Sleep Mode 3 at 38 is designed to save power and to allow the CPU to enter its own sleep mode. Deep Sleep Mode 3 involves powering down the LCD display subsystem, backing up any data to flash memory if required, and sending the CPU to sleep. To assist with these functions the exemplary portable game playing unit 10 maintains a real time clock. In the exemplary embodiment portable game playing unit 10 is programmed to wake up every 0.5 seconds using a 2 hz interrupt driven by a 32,768 hz crystal to keep the clock going in Deep Sleep Mode 3. The programmed computing mechanism of the exemplary portable game playing unit of the present invention also monitors the various user input buttons 16-24 for input from the game player to generate a wake up response and also enables the real time clock to move forward by ½ second.

It is this clock that enables the exemplary hunger, boredom and sleep patterns to be followed by the virtual character. Also the clock provides the present invention with the ability to execute set Clock/Alarm Mode 14 at 46 to set an alarm for the portable game playing unit which has the dual effect of waking up the game player as well as the virtual character. When Alarm Mode 14 at 46 actuates, the exemplary game of the present invention enters Snooze Mode 2. When an alarm event occurs it is passed from Alarm Mode 14 at 44 to Snooze Mode 2 at 36 for processing. This processing may involve playing an alarm animation on display 14 and generating a sound effect through audio out 26 or starting other animation sequences such as those illustrating the virtual character waking up from hunger or boredom. An alarm event from Bored Mode 14 at 44, or any of several virtual character timers, will send the virtual character from Deep Sleep Mode 3 at 38 to Waking Up Mode 1 at 34.

As an additional feature, the exemplary game of the present invention may be provided with a motion sensor that may be activated during transit of the portable game playing unit to wake a virtual character. However, in the exemplary embodiment of the present invention activation of the motion sensor is programmed so as not to wake up the portable game playing unit or delay the virtual character from entering sleep.

If desired, the game player can leave Snooze Mode 2 at 36 by pressing an input control button such as action button 28 or, alternatively, by selecting an item identified by pressing menu button 22. Making such a control input will wake up the virtual character. Similarly, other signals coming from Deep Sleep Mode 3 at 38 also can arouse the character and are programmed to be checked for by the portable game playing unit. For example, if the virtual character is hungry or bored the alarm will sound and the virtual character will wake up so that the game player can take the appropriate steps to address these conditions.

From Snooze Mode 2 at 36, the virtual character is able to enter one of the three main modes of the exemplary game of the present invention, Happy Mode 4 at 40, Hungry Mode 5 at 42, and Bored Mode 6 at 44. Each of these additional character modes has at least one animation sequence to take the virtual character from the snooze animation of Snooze Mode 2 at 36 to the starting frame animation associated with each additional character Modes 4-6 at 42-44. The virtual character also is able to leave each of these additional character Modes 4-6 at 42-44 and enter Snooze Mode 2 at 36 as appropriate to character activity and state. Once in Snooze Mode 2 at 36 the virtual character also is able to enter Deep Sleep Mode 3 at 38 as appropriate to game play, character activity, and state.

In accordance with the teachings of the present invention, if portable game playing unit 10 has been played with on a daily basis it is programmed to wake up after a normal sleep pattern for the respective virtual character defined therein. However, if the portable game playing unit is ignored for several days it may be programmed to enter Deep Sleep Mode 3 at 38 where it will not respond to anything but an alarm event or an input control button press. When there, if such an awakening input occurs the virtual character may be in Vacation Mode 15 at 48 or simply have given up and entered Departed Mode 13 at 50. Accordingly, the exemplary embodiment of Deep Sleep Mode 3 is designed to save battery power even when portable game playing unit 10 has been given up and left alone for significant time periods.

Once Mode 1 at 34 has been completed and the virtual character has woken up into Snooze Mode 2 at 36 the virtual character can proceed into and out of 3 nodal modes. In the exemplary embodiment of the present invention these nodal modes are identified as Happy Mode 4 at 40, Hungry Mode 5 at 42, and Bored Mode 6 at 44. As shown in FIG. 2, the virtual character can transition between nodal Modes 4, 5 and 6 at 40, 42, and 44 just as they can transition into and out of Snooze Mode 2 at 36. The clock timer dictates when the game determines that a virtual character needs a snooze at Mode 2, is getting hungry at Mode 5, or bored at Mode 6 and these Modes may be entered by the virtual character automatically utilizing appropriate animations for each transition when such a determination is made.

The exemplary embodiment of the present invention is programmed such that a happy virtual character is a healthy and content character. Thus, all things being normal, once awake the healthy and contented virtual character will leave Snooze Mode 2 at 36 and enter Happy Mode 4 at 40. Alternatively, when a hungry virtual character is fed or a bored virtual character becomes content through entertaining activities it will enter Happy Mode 4 at 40 as well.

All of the more engaging, entertaining, or fun activities provided in the exemplary game of the present invention can be carried out by the virtual characters from Happy Mode 4. These activities include access to Shopping/Upgrading Mode 7 at 52, access to Salon/Training Mode 8 at 54, access to On-line Mode 10 at 56, access to Playing Mode 11 at 58 and access to Looking Around Mode 12 at 60. Because the individual virtual characters of the present invention have the same generic features, exemplary Shopping/Upgrading Mode 7 at 52 is a generic Mode that can involve appropriate animation sequences programmed to display shopping for a girl targeted virtual character or upgrading for a boy targeted virtual character.

Salon/Training Mode 8 at 54 is an analogous generic mode with basic features and functions applicable to all virtual characters. Depending on the virtual characters involved, it can be modified to present appropriate animations. For example, animation sequences suitable for a girl operated virtual character might show the virtual character relaxing and changing her looks at a salon, whereas animation sequences suitable for a boy operated virtual character might show the virtual character training at a gym. Those skilled in the art will appreciate that such modifications are subtle and use the same underlying programming for each game version, with minor modifications and appropriately different animation sequences.

An additional aspect of the exemplary game of the present invention involves programming the individual virtual characters so that when they are in Happy Mode 4 at 40 they will engage in activities designed to humor their game player/owners. These optional activities can include spontaneous tricks, trying on different clothing combinations, or performing stunts. Optionally, the virtual characters also may try to show gratitude to their game player/owners for being happy and properly cared for by expressing love, friendship, or respect, depending on which expression is determined to be appropriate for the individual character involved.

When a virtual character enters Hungry Mode 5 at 42 the exemplary embodiment of the present invention is programmed so that the virtual character will not want to do certain things and will prefer to do other activities instead. For example, the hungry virtual character may enter Playing Mode 11 at 58 but will only be able to engage in playing activities that involve feeding. Or, the hungry virtual character may enter Snooze Mode 2 at 36 from Hungry Mode 5 at 42, but will return to Hungry Mode 5 as soon as it is awakened.

Similarly, the virtual character will be able to enter On-line Mode 10 at 56 as the game player may want the character to eat in the 3D virtual world of Planet Mion™ or the game player may direct the virtual character to enter Shopping/Upgrading Mode 7 at 52 where the virtual character will be able to engage in activities that involve acquiring food and consuming it, but will not be able to enter other sections of Mode 7. For example, the virtual character may enter Mode 7 and go to a restaurant section but will be unable to shop for clothes by entering a store section. Once the virtual character has been fed the exemplary game is programmed so that the virtual character will no longer be hungry and will decide if it is happy and will enter Happy Mode 4 at 40, or bored and will enter Bored Mode 6 at 44, depending upon other circumstances present in the game at that time.

To enhance both the entertainment value and the game player connection with the virtual characters of the present invention, the exemplary embodiment of the present invention includes programming so that when a virtual character enters Hungry Mode 5 at 42 various animation sequences will be displayed that will make it obvious to the game player that the virtual character is hungry. For example, if appropriate for the type of virtual character involved, the virtual character may make verbal suggestions through audio out 26 such as, "Let's go eat", or if the virtual character is a pet or animal it may make whining noises and chew on things, or make loud stomach rumbles and groaning.

If the software programming the exemplary embodiment of the present invention encounters circumstances indicating that a virtual character is bored, it will direct the character to enter Bored Mode 6 at 44 and will present appropriate animation sequences on display 14. For example, the animations may show the bored virtual character acting with indifference, mild disrespect, or misbehaving. Once in Bored Mode 6 at 44, the game player will find Bored Mode 6 to be less limiting than Hungry Mode 5. Bored virtual characters will be animated to show the game player that they do not want to enter Looking Around Mode 12 at 60 or do some of the more strenuous activities upon entering Salon/Training Mode 8 at 54.

However, upon entering Salon/Training Mode 8 at 54 the game player will find, for example, that the game has been programmed so that fun and exciting activities that decrease boredom are allowed and can be used to alter the virtual character's resting state from boredom so that the virtual character can return to Happy Mode 4 at 40. Conversely, activities in Salon/Training Mode 8 that are programmed to reward a happy character from Happy Mode 4 at 40 are not available to a bored character entering from Bored Mode 6 at 44. For example, rewarding activities that are not available to bored virtual characters may include activities that earn credits or money or that increase combat skills or pet training.

If completed successfully, when a virtual character shops or upgrades while in Shopping/Upgrading Mode 7 at 52 the virtual character can reduce being bored. The exemplary game of the present invention is programmed so that when a virtual character merely starts looking for items to buy or acquire the character's boredom counter will slow down, but not stop. Similarly, while shopping or upgrading the timers and counters that monitor how tired or hungry a virtual character is will also continue to run. Alarms may be programmed to continue running, but will not sound off until an input control button is pressed. Alternatively, the exemplary game can be programmed so that virtual characters with a large selection of items or upgrades will become bored more slowly because they can experiment with their possessions while on their own in Happy Mode 4 at 40.

While in Shopping/Upgrading Mode 7 at 52 a virtual character is able to acquire items, things, and skills to aid or enhance its virtual life both within portable game playing unit 10 or when on-line in Planet Mion™. The types and kinds of items and skills that can be acquired are dependent upon the type of virtual character involved in the game playing activity. For example, in the exemplary embodiment of the present invention credits can be acquired as pocket money, pet treats, or victory medals by, respectively, Bratz™, Pawz™, or Monsterz™ These credits are basically interchangeable and simply appear differently on different game playing units as appropriate for the virtual character defined or "living" in the individual game playing unit. Therefore if a Monsterz™ gives a medal to a Pawz™ character, it becomes a pet biscuit, while giving a medal to a Bratz™ character will result in the Bratz™ character receiving pocket money. In this manner different virtual characters can trade items while on-line or wirelessly when playing between each other on their IR linked portable game playing units.

A virtual character may earn money or credits while in Salon/Training Mode 8 at 54, while in Giving/Fighting Mode 9 at 62, or when on-line in On-line Mode 10 at 56. If desired, the exemplary game can be programmed so that the maximum number of credits that can be earned while playing in portable game playing unit 10 within a particular time period will be limited. This will encourage a game player to go into On-line Mode 10 at 56 more often in order to earn more credits. For example, the number of credits that can be earned within a portable game playing unit can be limited to four units within a 24-hour period.

Salon/Training Mode 8 at 54 is where a virtual character is able to enhance its wealth, personal well-being, and abilities. How this occurs is character dependent and involves appropriate character focused animation sequences. For example, the exemplary game is programmed so that while in Mode 8 Bratz™ virtual characters will have the salon and beauty options, Pawz™ characters will have the option of training for treats and going for walks, and Monsterz™ characters will be able to engage in battle training and tough challenges to earn medals.

As noted above, the exemplary game is programmed so that at least one activity within Salon/Training Mode 8 at 54 is not allowed when a character comes from Bored Mode 6 as the virtual character is programmed to view this activity as boring. For Pawz™ characters this not allowed activity is grooming. For Monsterz™ characters the not allowed activity is being cleaned. For Bratz™ characters the not allowed activity is tidying up their personal space. However, when not bored a virtual character performing these activities will receive its highest reward.

The exemplary embodiment of the present invention is programmed so that at least one activity in Salon/Training Mode 8 at 54 provides a mild hunger reduction and is not boring and at least one activity is exciting but does not alleviate hunger. For example, for an exemplary Bratz™ virtual character the feeding activity is preparing and eating breakfast cereal or something similar. The boredom reducing activity is a beauty treatment that involves cleaning and making the virtual character appear pretty, which they are programmed to enjoy. For an exemplary Pawz™ virtual character the feeding activity is catching and eating food items thrown to it. The boredom reducing activity is playing with its toys and the game player in games such as "fetch". The feeding activity for the exemplary Monsterz™ virtual characters is the equivalent of hunting for treats like a Pawz™ virtual character only the Monsterz™ are animated to use battle skills to reveal food morsels. The exemplary Monsterz™ boredom reducing activity is engaging in exciting sports such as racing against time or throwing objects to achieve a personal best result. Monsterz™ also are programmed to have a mock battle mode that earns no medals but allows the game player to play against the virtual character rather than to control it.

Giving/Fighting Mode 9 at 62 only can be entered by a virtual character from Looking Around Mode 12 at 60. This is because in the exemplary embodiment of the present invention the game is programmed so that a virtual character can perform these activities only when linked to another portable game playing unit by the wireless IR link. For example, for Pawz™ virtual characters Looking Around Mode 12 involves activities such as playing in the park and exchanging toys and accessories with other virtual characters. Looking around activities for Bratz™ virtual characters include being able to trade garments and personal items with other virtual characters and even using pocket money in these trades as not all items are available to them in Shopping/Upgrading Mode 7 at 52. For Monsterz™ Looking Around Mode 12 at 60 involves battling other Monsterz™ for medals.

A Monsterz™ virtual character cannot enter a battle without a stake of medals on offer to a competitor. Accordingly, in order to do battle a Monsterz™ virtual character must have earned these medals in Salon/Training Mode 8 at 54 or while on-line prior to entering Looking Around Mode 12 at 60 on its way to entering Giving/Fighting Mode 9 at 62. As an added aspect of the exemplary embodiment of the present invention, the game is programmed so that different battle modes require different numbers of medals that give different advantages to the virtual characters. For example, taking three medals into a battle may give the virtual player an extra life or access to special skills.

No matter how much of an imbalance the medals bring to the battle the exemplary game is programmed so that each player has some small chance to win or lose and the outcome is never 100%. A game player's skill in battle will be rewarded by selecting the appropriate special abilities of its Monsterz™ virtual character to use against a specific Monsterz™ character being faced. Actual winning and losing of a battle is not simply based on speed of reactions. Rather, decisions made by a game player throughout the battle along with a final random element determine a victor. The winning Monsterz™ character takes all of the medals brought to the fight.

Additionally, when in two player or linked mode using the wireless IR link-up features of two portable game playing units 10, the exemplary embodiment of the present invention is programmed to make it possible for the two linked game players to play at least one game available in Playing Mode 11 at 58 which can be accessed from Giving/Fighting Mode 9 at 62. For example, a standard game available in linked mode can be similar to rock-paper-scissors or tick-tac-toe. If desired, at least one unit of credit can be risked on each game and rewarded to the winning game player. As those skilled in the art will appreciate, the graphic artwork and animation for the standard games may appear different for each different virtual character, but the underlying game play may remain the same.

In the exemplary embodiment of the present intention when a virtual character is in Playing Mode 11 at 58 and playing a game, the game player participates to help the virtual character rather than play against it in competition. Thus, the playing of games is a cooperative environment where the game player and the character are on the same side. Conversely, some training elements in Salon/Training Mode 8 at 54 are semi-competitive, but involve no harm or rewards to the virtual character other than the training.

A virtual character can enter On-line Mode 10 at 56 from either Happy Mode 4 at 40, Hungry Mode 5 at 42, or Bored Mode 6 at 44. When in On-line Mode 10 the timers and counters that monitor how tired, bored, or hungry a virtual character may be continue to run until a connection is made to the web server through the connected computer. If such a connection is not made quickly, then when the virtual character finally arrives on Planet Mion™ it may be bored or hungry and it's on-line activities may be restricted accordingly until it is fed or entertained.

In the exemplary embodiment of the present invention when the translation from portable handheld game playing unit 10 to Planet Mion™ is initiated, display 14 of portable handheld game playing unit 10 will display a message or an animated sequence indicating that the virtual character is attempting to enter Planet Mion™. If a successful network or Internet connection is made the virtual character will enter Vacation Mode 15 at 48 and an appropriate graphic image will be presented on display 14. Meanwhile, the translated virtual character will appear in 3D on the computer screen where it can be controlled by the game player through the web server to interact in the 3D virtual world of Planet Mion™ on the computer network. If the game player chooses not to go on-line, the virtual character can be directed to leave On-line Mode 10 at 56 by pressing a control input button and it will return to Vacation Mode 15 at 48. Thus, when a virtual character is on-line it is no longer in On-line Mode 10 at 56, but in Vacation Mode 15 at 48. Therefore to return the virtual character to the portable game playing unit display 14 the web server must synchronize and re-flash the virtual character defining data to the portable game playing unit in order to bring the virtual character out of Vacation Mode 15 at 48.

Another future of the exemplary embodiment of the present invention is programming that allows a virtual character that has been ignored or disregarded for a long period of time to become depressed and eventually leave the active features of portable handheld game playing unit 10. For example, a virtual character can become depressed and leave after a few days of total inactivity. When a virtual character leaves it will enter Departed Mode 13 at 50 and a message will be presented on display 14 indicating to the game player that the virtual character has departed. If this occurs there are two ways to return a departed virtual character to the now vacant portable game playing unit 10. The first method for returning a departed virtual character is to restart portable game playing unit 10. This will restart portable game playing unit 10 and take it through reset/first power at 30 and through Rebirth Mode 0 at 32. The second method for returning a departed virtual character is to plug portable game playing unit 10 into the computer which will allow entry into On-line Mode 10 where an option will be presented to the game player allowing it to acquire another compatible virtual character and to translate that virtual character back into the vacant portable game playing unit 10.

This feature of the exemplary embodiment of the present invention makes it possible for a portable game playing unit 10 to be left "empty". This feature is designed to allow game operators to create more complex or different virtual characters that can be downloaded into vacant portable game playing units. Accordingly, when a virtual character has entered Departed Mode 13 at 50 a message may be presented on display 14 or the connected computer screen informing the game player that either a new virtual character can be purchased on-line, or to reset the portable game playing unit and train a new standard virtual character without going on-line.

Functionally speaking, when a virtual character of the present invention is in Vacation Mode 15 at 48 or in Departed Mode 13 at 50 there is no real difference perceived by the game player. After several days in Vacation Mode 15 at 48 a timer will activate and the virtual character will enter Departed Mode 13 at 50 and will notify the game player that he can reset the portable game playing unit or purchase a new or enhanced character on-line. The web server software will not let a game player play without a virtual character. Thus, for all practical purposes, it is not possible for a game player to let a virtual character live on-line only. Rather, a virtual character must exist in either Vacation Mode 15 at 48 or in Departed Mode 13 at 50 within portable game playing unit 10. The web server software may be programmed to provide a limited explanatory demonstration to the game player if no virtual character exists in the portable game playing unit to alert the game player to this issue.

When a virtual character of the present invention enters Playing Mode 11 at 58 there are a variety of games that can be played depending upon which virtual character is owned and being played by the game player. In the exemplary embodiment of the present invention two of these games are universal and exist in all of the portable game playing units, although each will have custom artwork designed for each specific virtual character. Exemplary universal games are rock-paper-scissors and tic-tac-toe. Additionally, each portable game playing unit can include a custom one player game which, depending on the virtual character being played, can include basic elements such as dancing to an increasing rhythm, catching or shooting at ever increasing difficulties, dodging while collecting, and memory games such as turning over patterned cards and remembering pairs.

As shown in FIG. 2, a virtual character cannot enter Playing Mode 11 at 58 when hungry. Further, if a virtual character is in Playing Mode 11 at 58 when the hungry system timer times out or the virtual character exits Playing Mode 11 at 58 when hungry it will return directly to Hungry Mode 5 at 42 and must be fed before reentering Playing Mode 11 at 58. Similarly, if a virtual character in Looking Around Mode 12 at 60 becomes hungry it will move to Hungry Mode 5 at 42. If the virtual character becomes bored it will move from Looking Around Mode 12 at 60 to Bored Mode 6 at 44. However, a virtual character can move into and out of Looking Around Mode 12 at 60 from either Happy Mode 4 at 48 or Giving/Fighting Mode 9 and 62.

When a virtual character is in Looking Around Mode 12 at 60 the exemplary game of the present invention is programmed to enable the CPU to dedicate itself to looking for other virtual characters through the IR communications port using IR transceiver hardware as known in the art. To change from passively looking for another virtual character to initiating contact and sending a wireless IR message to another virtual character, the game player presses any button other than on/off button 16 or reset button 28. This will result in the portable game playing unit presenting an icon or message on display 14 letting the game player know that it needs to press another identified button to start communication with a linked portable game playing unit 10.

For communication to be successful a second game player must position a second portable game playing unit 10 in line of sight IR communication with the first player's portable game playing unit 10 and the second portable game playing unit 10 also must have its virtual character in Looking Around Mode 12 at 60. Once the IR linked portable game playing units have paired up each will enter Giving/Fighting Mode 9 at 62 and the two virtual characters can interact. If the two virtual characters are not both the same type, they will be limited in what activities they can do together as designed into the software of the respective portable game playing units.

For example, in the exemplary embodiment of the present invention Bratz™ are programmed so that they can give Pawz™ treats and toys that they can buy in Shopping/Upgrading Mode 7 at 52. They can play rock-paper-scissors and tic-tac-toe with Bratz™ and Monsterz™ but not with Pawz™. They can give and receive any item or pocket money from other Bratz™. They can give food to Monsterz™ in exchange for pocket money or medals. In the exemplary embodiment of the present invention feeding Monsterz™ is the only way to keep them docile as these characters are designed and programmed to exhibit this interesting personality characteristic.

Pawz™ are programmed so that they can increase Bratz™ happiness when they beg to receive treats or show affection after having received toys. Pawz™ also can give toys to Bratz™ and receive much happiness from this activity and even treats in exchange. They also can play rock-paper-scissors with other Pawz™ and with Monsterz™ for dog treats. They cannot play tic-tac-toe with anyone including other Pawz™. This is because the exemplary embodiment of the present invention is programmed to correspond with the perceived game player belief that it would generate disbelief in Bratz™ and Monsterz™ if they saw Pawz™ drawing and because Monsterz™ are programmed so that they do not like playing tic-tac-toe with anyone but themselves.

Monsterz™ are programmed to play rock-paper-scissors obsessively and with every other virtual character. Here, the exemplary embodiment of the present invention is programmed to reflect a perceived game player belief that because Monsterz™ are a fantasy character disbelief is less important. Monsterz™ can play tic-tac-toe with other Monsterz™ and give medals to Bratz™ that are converted to pocket money. Monsterz™ can receive only food in exchange. They can give food to Pawz™ but receive no happiness from this action as they only want to keep Pawz™ from being hungry and needing a feeding break that would prevent Monsterz™ from playing more rock-paper-scissors.

As those skilled in the art will appreciate, although arbitrary, this exemplary virtual character programming gives identifiable personality to the individual virtual characters without restricting their compatibility to interact with each other. This increases game player interaction as well and also may encourage individual game players to own multiple portable game playing units defining different virtual characters in order to play the game of the present invention on-line with different capabilities and character attitudes.

Once the portable game playing unit of the present invention has been purchased and initialized by a game player or owner, the unit's system clock and a single repeat alarm event may be set within Set Alarm/Clock Mode 14 at 46. For example, for Bratz™ virtual characters some diary functions can be tracked including birth date alarms and names and numbers of friends. This information can be edited in On-line Mode 10 at 50 rather than within the portable game playing unit. Only the clock and alarm can be changed from within the portable game playing unit. Once in On-line Mode 10 at 50 the clock and date can be updated by the Web server. Additionally, personal information and reminders may be entered by the game player and will translate back to the appropriate portable game playing unit so that they may appear on display 14 and be edited or deleted from Set Alarm/Clock Mode 14 at 46.

The exemplary game of the present invention is programmed so that the game player or game owner identity can be stored in either or both the portable game playing unit or the web server. Within Set Alarm/Clock Mode 14 at 46 and On-line Mode 10 at 56 it is possible to change the game player name as well as the name of a new virtual character that has been downloaded. However once the new character has been named the name cannot be changed unless the game player decides to reset the portable game playing unit and enter Re-Birth Mode 0 at 32 or enter Departed Mode 13 to purchase a newly created character on-line.

This game player name protection is designed to discourage the theft of a portable game playing unit or of a specific well-developed virtual character because the game player's name will be preserved unless a unit is reset and all the training and character enhancing data is lost. Additionally, a game player has a specific on-line password and e-mail address that will prevent another game player from taking possession of a virtual character on-line by using the same game player name. In order to avoid conflicts and to cope with the event that a game player name is already taken by another game player when going into On-line Mode 10 at 56, a game player wishing to use an existing name will be offered the chance to change names when the virtual character returns from Vacation Mode 15 at 48.

The exemplary game of the present invention is programmed so that the only way to return from Vacation Mode 15 at 48 is for the web server to reintroduce the virtual character to the portable game playing unit. Alternatively, if the portable game playing unit is not connected to a computer the game player can return the virtual character by resetting the portable game playing unit to enter Re-Birth Mode 0 at 32.

Leaving a portable game playing unit of the present invention connected to a computer that is powered up will provide safe charging of the batteries in the portable game playing unit without losing any data or creating a Re-Birth Mode 0 event where acquired virtual character data is lost. If the computer crashes while a virtual character is on-line the game player will have to return on-line and retrieve the virtual character from the web server before continuing with any on-line activities. If the computer crashes before the Web server has copied the virtual character identifying data transmitted from the portable game playing unit the virtual character will not be in On Vacation Mode 15 at 48 and the portable game playing unit will retain the specific details of the virtual character in memory. If the computer crashes while translating the virtual character back to the portable game playing unit and re-flashing the memory it will remain possible to re-flash the memory when the game player goes back on-line.

If the connector computer has several USB ports, depending upon driver compatibility it should be possible for a game player owning several portable game playing units to have several virtual characters on-line. Each virtual character should be able to move back into any compatible portable game playing unit to enter either On Vacation Mode 15 at 48 or Departed Mode 13 at 50. This is because a single read-only memory will contain all of the basics for a specific genre of virtual characters. Thus, in accordance with the teachings of the present invention only three read-only memory stored genre types will be sufficient to create the three exemplary virtual character types, Bratz™, Pawz™, and Monsterz™ Additionally, flash memory will play a significant role in the present invention and may be utilized to contain some or all of this generic character identifying information, as long as enough free space is retained for characteristic changing and updating data.

It should be pointed out that for purposes of the present invention the term "game play" is not restricted to the "play" of simple "games". Instead, the phrase is to be interpreted its broadest sense, as the present invention has broad applicability to a wide variety of electronic fields of activity ranging from children's games directed to having fun, to teaching environments directed to acquiring new and different skills or levels of skill and understanding, as well as to adult focused behaviors having serious and even professional purposes going beyond mere entertainment. With this understanding it will be appreciated by those of ordinary skill in the art that the present invention can be useful as well as entertaining to a wide variety of intended audiences when modified to target a specific audience in accordance with the teachings of the present invention.

It will further be appreciated that, although the illustrative embodiment has been presented with reference to specific cabling and interconnection types such as USB ports and cables and IR ports, the type of connection between units is not critical to the invention, and in general any operative connection between devices will suffice. As used here, therefore, the term "communications port" should be understood in its broadest sense to encompass any input/output channel by which devices communicate, including both wired and wireless communication.

Further, it will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Further, a person skilled in the art of software and computer networking will be able to write software that will implement the functions of the present invention from the foregoing description. Additionally, a person skilled in the art of digital or computer animation will be able to produce the animation sequences needed to practice the present invention. Although the present invention has thus been described in detail with regard to the exemplary embodiments and associated drawings thereof, it should be apparent to those skilled in the art that various adaptations and modifications of the present invention may be accomplished without departing from the spirit and the scope of the invention.

For example, individual portable handheld game playing units can define more than one character that may or may not be user controlled. In one such instance a game unit defined character may have a companion, a team, or a pet associated with it that will translate to and from the computer driven or Internet virtual world with the character. This companion, team, or pet can be autonomous or user controlled. Additionally, different types of handheld units defining different types of characters can translate their respective characters to the same interactive virtual world. Further, the virtual worlds or operating environments to which the individual characters of the present invention translate to and from can differ in a manner other than the number of dimensions, such as moving from an Earth based environment to a zero gravity space environment or from an aquatic environment to a desert environment and back.

Accordingly, it is to be understood that the detailed description and the accompanying drawings as set forth hereinabove are not intended to limit the breadth of the present invention, which should be inferred only from the following claims and their appropriately construed legal equivalents.

We claim:

1. A game system comprising:
a portable game playing unit for playing an electronic game, the portable game playing unit having a display, a computing mechanism for generating a first virtual character on the display, and a communications port for operatively connecting the portable game playing unit to a first computer, the first computer having an associated computer screen;
software programming the portable game playing unit computing mechanism and the first computer such that:
the first virtual character translates from the portable game playing unit display to the computer screen and back to the portable game playing unit display in response to commands input to the game system by a first player;
when the first virtual character is on the portable game playing unit display, the first virtual character engages in a fight with a first opponent, the first opponent not being controlled by another player, the first virtual character obtaining increased fighting skills as a result of said fight with the first opponent;
the first virtual character, after having engaged in said fight, then translates to said computer screen;
when the first virtual character translates to said computer screen, the portable game playing unit is automatically updated so that the first virtual character is no longer available for play on the portable game playing unit;
when the first virtual character is on the computer screen, the first virtual character acts within a multi-player virtual world according to commands input by the first player, the multi-player virtual world including at least a second virtual character controlled by a second player, the first virtual character's increased fighting skills having persisted from the portable game playing unit to the multi-player virtual world;
in the multi-player virtual world, the first virtual character engages in a fight with the second virtual character, the first virtual character's fighting actions being controlled by the first player and the second virtual character's fighting actions being controlled by the second player; and
when the first virtual character fights with the second virtual character in the multi-player virtual world, the first virtual character has the increased fighting skills that the first virtual character obtained while on the portable game playing unit display, those increased fighting skills having persisted across environments from the portable game playing unit to a multi-player fighting environment in the multi-player virtual world, such that the first virtual character's fighting skills when in the multi-player fighting environment is enhanced by the first virtual character's experiences fighting on the portable game playing unit display without a virtual character controlled by a second player.

2. The game system of claim 1 wherein when the first virtual character translates from the portable game playing unit display to the multi-player virtual world the first virtual character ceases to be displayed on the portable game playing unit display and is displayed in the multi-player virtual world, and when the first virtual character translates from the multi-player virtual world to the portable game playing unit display the first virtual character ceases to be displayed in the multi-player virtual world and is displayed on the portable game playing unit display.

3. The game system of claim 2 wherein when the first virtual character translates from the portable game playing unit display to the multi-player virtual world the software is programmed to generate and display the first virtual character in three dimensional perspective on the computer screen with the ability to act and move in three dimensions under the control of the first player; and
when the first virtual character translates from the multi-player virtual world to the portable game playing unit display software within the portable game playing unit is programmed to generate and display the first virtual character in two dimensions on the display with the ability to act and move in two dimensions under the control of the first player.

4. The game system of claim 1 wherein at least one additional characteristic of the first virtual character other than fighting ability can change while the first virtual character is on the portable game playing unit display and persists when the virtual character translates from the portable game playing unit display to the multi-player virtual world or back.

5. The game system of claim 1 wherein the portable game playing unit defines a first portable game playing unit, the system further comprising:
a second portable game playing unit operated by the second player and having a second display, a second computing mechanism for generating a second virtual character on the second display, and a second communications port for connecting the second portable game playing unit to a computer coupled to the first computer, the second computer having an associated second computer screen.

6. A game system comprising:
a portable game playing unit for playing an electronic game, the portable game playing unit having a display, a computing mechanism for generating a virtual character on the display, and a communications port for operatively connecting the portable game playing unit to a computer coupled to a computer network, the computer having an associated computer screen;

software programming the portable game playing unit computing mechanism, the computer, and the server, respectively such that:
  the virtual character translates from the portable game playing unit display to the computer screen and back to the portable game playing unit display in response to commands input to the game system by a first player;
  when the virtual character translates to said computer screen, the portable game playing unit is automatically updated so that the virtual character enters a vacation mode within the portable game playing unit, the first virtual character being no longer available for the user to play with on the portable game playing unit;
  when the virtual character is on the computer screen, the virtual character acts within a virtual world according to commands input by the first player;
  the virtual character engages in an activity on at least one of the portable game playing unit display and the computer screen thereby obtaining increased activity skills; and
  said increased activity skills persists when the character translates from at least one of the portable game playing unit display and the computer screen to the other of the portable game playing unit and the computer screen.

7. The game system of claim 6 wherein said virtual character has at least one additional characteristic in addition to said activity skills that change during progression of play, said additional characteristic being selected from the group consisting of physical appearance, interests, training, learning, memory, mobility, flexibility, thirst, and hunger.

8. The game system of claim 6 wherein:
  when the player plays the game on the portable game playing unit display and the unit is not coupled to the computer, the virtual character fights an opponent that is not controlled by a second player;
  said fighting causes fighting ability of the virtual character to change; and
  when the virtual character translates from the portable game playing unit to the computer screen, the changed fighting ability persists in a virtual world presented on the computer screen.

9. The game system of claim 6 wherein the player defines a first player, the portable game playing unit defines a first portable game playing unit, the virtual character defines a first virtual character, the computer defines a first computer, the computer screen defines a first computer screen, and wherein the system further comprises:
  a second portable game playing unit operated by a second player, the second portable game playing unit having a display, at least one player input control, and a computing mechanism for generating a second virtual character on the second portable game playing unit display;
  the second portable game playing unit operatively connected to a second computer having a second computer screen, the first and second computers being operatively connected across a global network; and wherein:
  the second virtual character translates from the second portable game playing unit display to the second computer screen and back to the second portable game playing unit display in response to commands input to the game system by the second player;
  when the second virtual character translates to said second computer screen, the second portable game playing unit display is automatically updated so that the second virtual character is no longer available for play thereon;
  the first and second virtual characters interact in a multi-player virtual world, the virtual world being displayed on the first computer screen from the perspective of the first virtual character, and the virtual world being displayed on the second computer screen from the perspective of the second virtual character;
  fighting between the first and second virtual characters causes the second virtual character to gain an increase in fighting ability; and
  said increased fighting ability of the second character persists when the second character translates from the second computer to the second portable game playing unit display.

10. The game system of claim 6 further comprising non-volatile memory for storing changes to the characteristics of the virtual character and delivering updated characteristics of the virtual character to the portable game playing unit or the computer network.

11. The game system of claim 9 wherein the two virtual characters interact in the multiplayer virtual world causing at least one of the virtual character's characteristics in addition to fighting ability to change in a way that persists when that virtual character returns to its respective portable game playing unit display from the computer screen or back.

12. The game system of claim 6 wherein the computer network is a global computer network.

13. The game system of claim 6 wherein the updated fighting ability of the second virtual character persists within the second portable game playing unit even when the second portable game playing unit is disconnected from the computer and is powered down and powered back up again.

14. The game system of claim 6 further comprising:
  software for providing, for a fee, a second virtual character to the player, the second virtual character appearing within the virtual world and then moving to the portable game playing unit display.

15. The game system of claim 14 wherein the second virtual character has additional characteristics that game play causes to be changed, the changed characteristics persisting when the second virtual character moves from the virtual world to the portable game playing unit display and back.

16. The game system of claim 9 further comprising a wireless communications port on each of the portable game playing units for interactively connecting the two portable game playing units together.

17. A game system comprising:
  a first portable game playing unit for playing an electronic game, the first portable game playing unit having a display, at least one player input control, a computing mechanism for generating a first virtual character on the display, and a communications port for operatively connecting the first portable game playing unit to a first computer coupled to a computer network, the computer having an associated first computer screen;
  software programming the first portable game playing unit computing mechanism and the first computer, respectively such that:
    the first virtual character translates from the first portable game playing unit display to a multi-player virtual world appearing on the first computer screen and back to the first portable game playing unit display in response to commands input to the game system by a first player;

when the first virtual character translates to said first computer screen, the first portable game playing unit display is automatically updated so that the first virtual character is no longer available for play on the first portable game playing unit;

when the first virtual character is in the multi-player virtual world, the first virtual character acts therein according to commands input by the first player;

the first virtual character engages in a fight with an opponent, in response to which a fighting skill of the first virtual character is increased;

said increased fighting skill persists when the first virtual character translates from a first one of the first portable game playing unit display and the first multi-player virtual world to a second one of the first portable game playing unit and the multi-player virtual world;

a second portable game playing unit operated by a second player, the second portable game playing unit operatively connected to a second computer having an associated second computer screen, the first and second computers being operatively connected across a global network; and wherein:

a second virtual character translates from the second portable game playing unit display to a multi-player virtual world appearing on the second computer screen and back to the second portable game playing unit display in response to commands input to the game system by the second player;

when the second virtual character translates to said second computer screen, the second portable game playing unit display is automatically updated so that the second virtual character is no longer available for play thereon;

the first and second virtual characters interact in the multi-player virtual world, the multi-player virtual world being displayed on the first computer screen from the perspective of the first virtual character and displayed on the second computer screen from the perspective of the second virtual character;

the second virtual character engages in a fight with an opponent, in response to which a fighting skill of the second virtual character is increased;

said increased fighting ability of the second virtual character persists when the second virtual character translates from a first one of the second portable game playing unit display and the multi-player virtual world to a second one of the second portable game playing unit and the multi-player virtual world.

18. The game system of claim 17 wherein:

when the first and second virtual characters are on the first and second portable game playing units, respectively, and are not in the multi-player virtual world, commands input by the first and second players cause characteristics other than fighting skill of the first and second players, respectively, to change; and the changed characteristics persist when the characters thereafter move from the portable game playing units to the multi-player virtual world, such that when the first and second virtual characters have both moved to the multi-player virtual world, those characters interact therein in accordance with their respectively changed and persisting characteristics.

19. The game system of claim 17 wherein:

when the first and second characters are both in the multi-player virtual world and are not on the first and second game playing units, commands input by the first and second players cause the virtual characters to interact in a way that causes additional characteristics of the virtual characters to respectively change; and the changed additional characteristics of the characters persist when the characters thereafter move from the multi-player virtual world to their respective portable game playing units, such that when the first and second virtual characters have both moved to their respective game playing units, those characters act within their respective portable game playing units in accordance with their respectively changed and persisting additional characteristics.

* * * * *